(12) United States Patent
Misra et al.

(10) Patent No.: US 10,771,314 B2
(45) Date of Patent: Sep. 8, 2020

(54) LEARNING BASED INCIDENT OR DEFECT RESOLUTION, AND TEST GENERATION

(71) Applicant: ACCENTURE GLOBAL SOLUTIONS LIMITED, Dublin (IE)

(72) Inventors: Janardan Misra, Bangalore (IN);
Divya Rawat, Dehradun (IN);
Shubhashis Sengupta, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 149 days.

(21) Appl. No.: 16/130,713

(22) Filed: Sep. 13, 2018

(65) Prior Publication Data

US 2019/0089577 A1 Mar. 21, 2019

(30) Foreign Application Priority Data

Sep. 15, 2017 (IN) .............................. 201711032766

(51) Int. Cl.

| G06F 11/00 | (2006.01) |
| H04L 12/24 | (2006.01) |
| G06F 11/36 | (2006.01) |
| G06F 11/34 | (2006.01) |
| G06N 20/00 | (2019.01) |
| G06F 16/901 | (2019.01) |
| H04L 12/26 | (2006.01) |

(52) U.S. Cl.
CPC ...... *H04L 41/0636* (2013.01); *G06F 11/3476* (2013.01); *G06F 11/3684* (2013.01); *G06F 16/9024* (2019.01); *G06N 20/00* (2019.01); *H04L 41/145* (2013.01); *H04L 41/16* (2013.01); *H04L 41/5074* (2013.01); *H04L 41/0645* (2013.01); *H04L 43/50* (2013.01)

(58) Field of Classification Search
CPC ............... G06F 11/079; G06F 11/3447; G06F 11/3476; G06F 11/2268; G06F 11/368
See application file for complete search history.

(56) References Cited

U.S. PATENT DOCUMENTS

| 9,524,475 | B1 * | 12/2016 | Cmielowski | G06F 11/079 |
| 2011/0214020 | A1 * | 9/2011 | Caspi | G06F 11/0709 714/37 |
| 2012/0066547 | A1 * | 3/2012 | Gilbert | H04L 41/065 714/26 |
| 2015/0271008 | A1 * | 9/2015 | Jain | G06F 11/079 714/57 |

\* cited by examiner

*Primary Examiner* — Charles Ehne
(74) *Attorney, Agent, or Firm* — Mannava & Kang, P.C.

(57) ABSTRACT

In some examples, learning based incident or defect resolution, and test generation may include ascertaining historical log data that includes incident or defect log data associated with operation of a process, and generating, based on the historical log data, step action graphs. Based on grouping of the step action graphs with respect to different incident and defect tickets, an incident and defect action graph may be generated to further generate a machine learning model. Based on an analysis of the machine learning model with respect to a new incident or defect, an output that includes a sequence of actions may be generated to reproduce, for the new incident, steps that result in the new incident, reproduce, for the new defect, an error that results in the new defect, identify a root cause of the new incident or defect, and/or resolve the new incident or defect.

20 Claims, 47 Drawing Sheets

Historical Defect 1

| Defect Description | Debit Type Transactions not getting Updated in Account Transaction History for Account 000010000 for Cif 1000000000 |
|---|---|
| Reproduction Steps | |
| Step 1 | Enter Admin Account as Super User |
| Step 2 | Click on new Scenario |
| Step 3 | Populate Search Field with Customer ID Details 1000000000 |
| Step 4 | Select Customer which match up details |
| Step 5 | Navigate to MyClient and then select MyAccounts |
| Step6 | Select Account 000010000 |
| Step 7 | Attach Test Transaction from AdminTestAccount |
| Step 8 | Select Test Transaction Type option as Debit |
| Step 9 | Select Payment Option as Account |
| Step 10 | Navigate to Home Page |
| Step 11 | Navigate to MyClient and then select MyAccounts |
| | .................. |

| | | | |
|---|---|---|---|
| Step 12 | Select Active Account with Account Number 000010000 | | |
| Step 13 | Select View Transaction History | Expected Result: recentTransaction is not from AdminTestAccount | Check Condition: if recentTransaction is not from AdminTestAccount then {"Successful to Reproduce Steps"} else "Failed to Reproduce Steps" |
| Step 14 | Submit | | |

NOTE: Parameters derived from and specific to defect description are shown in black boxes

FIG. 5

Historical Defect 2

| | |
|---|---|
| Reproduction Steps | |
| Step 1 | Login as Super User to Admin Account |
| Step 2 | Create a new Scenario |
| Step 3 | Type Customer ID as 0100000001 in Search Field |
| Step 4 | Customer of equivalent matching details to be selected |
| Step 5 | Click through MyClient and then select Cards |
| Step 6 | Select Active Card 2000-2000-2000-2000 |
| Step 7 | Go to Cards and then select Reward Points |
| Step 8 | If Points<K Return With Fail Status and Exit |
| Step 9 | Else Go Back to Cards tab |
| Step 10 | Attach Test Transaction from AdminTestAccount |
| Step 11 | Select Test Transaction Type option as Debit |

| | | | |
|---|---|---|---|
| Step 12 | Select Payment Option as Reward Points | | |
| Step 13 | Navigate to Home Page | | |
| Step 14 | Click through MyClient and then select Cards | | |
| Step 15 | Select Active Card 2000-2000-2000-2000 | | |
| Step 16 | Select My Points and then select Purchase History | Expected Result: recentTransactionStatus from AdminTestAccount is Failed | Check Condition: if recentTransactionStatus from AdminTestAccount is Failed then AdminTestAccount is ("Successful to Reproduce Steps") else "Failed to Reproduce Steps" |
| Step 17 | Submit | | |

NOTE: Parameters derived from and specific to defect description are shown in black boxes ●

*FIG. 6*

Historical Defect 3

| Reproduction Steps | |
|---|---|
| Step 1 | Enter to Admin Account as Super User |
| Step 2 | Select for a New Scenario |
| Step 3 | Enter Customer ID Details as 0100000000 in Search Field |
| Step 4 | Select Customer with matching Details |
| Step 5 | Navigate to MyClient and then select Cards |
| Step 6 | Select Active Card 9000-2000-9000-2000 |
| Step 7 | Navigate to Cards and then select Reward Points |
| Step 8 | If Points<K, Return With Fail Status and Exit |
| Step 9 | Else Go Back to Cards tab |
| Step 10 | Add Test Transaction from AdminTestAccount |
| Step 11 | Select Test Transaction Type option as Debit |
| Step 12 | Select Payment Option as Reward Points |
| Step 13 | Navigate to Home Page |
| Step 14 | Click through MyClient and then select Cards |
| Step 15 | 9000-2000-9000-2000 |
| Step 16 | Select My Points and then select Purchase History | Expected Result: recent.TransactionStatus is from AdminTestAccount is failed |
| Step 17 | Submit | Check Condition: if recent.TransactionStatus is from AdminTestAccount is failed then "Successful to Reproduce Steps" else "Failed to Reproduce Steps" |

NOTE: Parameters derived from and specific to defect description are shown in black boxes ●

*FIG. 7*

Historical Defect 4

| | Defect Description: Credit Card Transaction History is Displayed Even Though Card is Expired and Number Does Not Match with an Account (Reproducible) | | |
|---|---|---|---|
| Reproduction Steps | | | |
| Step 1 | Login to Admin Account (Super User) | | |
| Step 2 | Create a new Scenario | | |
| Step 3 | Populate CustomerId Details as 0000000001 in Search Field | | |
| Step 4 | Choose Customer Account with matching Details | | |
| Step 5 | Navigate to MyClient and then select Cards | | |
| Step 6 | Select Active Card with CardNumber 1000-1000-1000-1000 | | |
| Step 7 | Select View Transaction History | Expected Result: TransactionHistory is None | Check Condition: if Transaction history is None then {1. make db call to select from transaction DB if result(Get next(empty) return "Successful" to Reproduce Steps"} else "Failed to Reproduce Steps" |
| Step 8 | Submit | | |

FIG. 8

Historical Defect 5

| Defect Description | Description given relating to the Issue of the transaction history of customer credit card of a bank not being retrievable/fetched from DB Database) |
|---|---|
| Reproduction Steps | |
| Step 1 | Login Admin Account with Super User access |
| Step 2 | Click on a New Scenario |
| Step 3 | Enter Customer ID Details as 1100100000 in Search Field |
| Step 4 | Select Customer with matching Details |
| Step 5 | Click on MyClient and then select Cards |
| Step 6 | Select Active Card 0100-0100-0100-0100 |
| Step 7 | Click on View Transaction History |
| Step 8 | Apply Date Filter — Expected Result: Transaction History is Empty — Check Condition: If Transaction History is Empty, then 1. Make db call to select from transaction DB 2. If resultSet is nonEmpty return "successful" else "Reproduce Steps". Else return "Failed to Reproduce Steps." |
| Step 9 | Submit |

FIG. 9

Defect 1

Defect Description - Debit Type Transactions not getting Updated in Account Transaction History for Account 000010000 for CID 1000000000

| | Reproduction Step Description | Conditions |
|---|---|---|
| 1.1 | Enter Admin Account as Super User | If Login is Successful continue else Exit Code 001 – Unauthorized Access |
| 1.2 | Click on new Scenario | |
| 1.3 | Populate Search Field with Customer ID Details 1000000000 | If resultList is notEmpty continue else Exit Code 002 – Incorrect Details |
| 1.4 | Select Customer which match up details | |
| 1.5 | Navigate to MyClient → MyAccounts, Check for Acc No. | If Account is Found continue else Exit Code 002 – Incorrect Details |
| 1.6 | Select Account 000010000 | |
| 1.7 | Add Test Transaction from AdminTestAccount | |
| 1.8 | Select Test Transaction Type option as Debit | |
| 1.9 | Select Payment Option as Account | If Payment is Success continue to Step 1.12 else (check if AttemptFlag is 0 goto Step 1.11 else goto Step 1.10) |
| 1.10 | AttemptFlag=0 | If AttemptFlag<3 continue to Step 1.7 else Exit Code 002 – Incorrect Details |
| 1.11 | AttemptFlag+=1 | |
| 1.12 | Navigate to Home Page | |
| 1.13 | Navigate to MyClient → MyAccounts | |
| 1.14 | Select Active Account with Account Number 000010000 | If Account is Found continue else Exit Code 002 – Incorrect Details |
| 1.15 | Select View Transaction History | Check Condition, if recentTransaction is not from AdminTestAccount Exit with status Failed else Exit with Status Success |
| 1.16 | Submit | |

NOTE: Parameters derived from and specific to defect description are shown in black boxes ■

FIG. 14

Defect 2

Defect Description - Unable to use reward points when greater than threshold 300 from Credit Card 2000-2000-2000-2000 for CID 010000001

| | Reproduction Step Description | Conditions |
|---|---|---|
| 2.1 | Login as Super User to Admin Account | If Login is Successful continue else Exit Code 001 – Unauthorized Access |
| 2.2 | Create a new Scenario | |
| 2.3 | Type Customer ID as 010000001 in Search Field | If resultset is not-Empty continue else Exit Code 002 – Incorrect Details |
| 2.4 | Customer of equivalent matching details to be selected | |
| 2.5 | Click through MyClient → Cards; Check for Card | If Card is Found continue else Exit Code 002 – Incorrect Details |
| 2.6 | Select Active Card 2000-2000-2000-2000 | |
| 2.7 | Go to Cards → Reward Points | If reward points < 300 Exit Code 002 – Incorrect Details else continue |
| 2.8 | Attach Test Transaction from AdminTestAccount | |
| 2.9 | Choose Test Transaction Type option as Debit | |
| 2.10 | Select Payment Option as Reward Points | If Payment is Success continue to Step 2.12 else (check if AttemptFlag is set goto Step 1.1 else goto Step 2.10) |
| 2.11 | AttemptFlag=0 | |
| 2.12 | AttemptFlag+=1 | If AttemptFlag<3 continue to Step 2.7 else Exit Code 002 – Incorrect Details |
| 2.13 | Navigate to Home Page | |
| 2.14 | Click through MyClient → Cards | |
| 2.15 | Select Active Card 2000-2000-2000-2000 | If Card is Found continue else Exit Code 002 – Incorrect Details |
| 2.16 | Go to Cards → Reward Points | |
| 2.17 | Select My Points → Purchase History | Check Condition: if recentTransaction is not from AdminTestAccount Exit with status Failed else Exit with Status Success |
| 2.18 | Submit | |

*FIG. 16*

Defect 3

Defect Description - Credit Card Transaction History not visible for Card Number 1000-1000-1000-1000 and Customer ID 0000000001

| | Reproduction Step Description | Conditions |
|---|---|---|
| 3.1 | Login to Admin Account (Super User) | If Login is Successful continue else Exit Code 001 – Unauthorized Access |
| 3.2 | Create a new Scenario | |
| 3.3 | Populate CustomerId Details as 0000000001 in Search Field | If resultset is nonEmpty continue else Exit Code 002 – Incorrect Details |
| 3.4 | Choose Customer Account with matching Details | |
| 3.5 | Click through MyClient → Cards; Check for Card | If Card is Found continue else Exit Code 002 – Incorrect Details |
| 3.6 | Select Active Card with CardNumber 1000-1000-1000-1000 | |

| | | |
|---|---|---|
| 3.7 | Select View Transaction History | If TransactionHistory is None then goto step 3.8 else Exit with Failed Status |
| 3.8 | Make a db call to fetch transactions | If resultSet is Empty then Exit with status Success else Exit with Failed Status |
| 3.9 | Submit | |

*FIG. 18*

Defect 4

Defect Description - Debit Type Transactions not getting Updated in Account Transaction History for Card 1101-1000-1000-1000 for CID 1000000001

| | Reproduction Step Description | Conditions |
|---|---|---|
| 4.1 | Enter Admin Account as Super User | if Login is Successful continue else Exit Code 001 – Unauthorised Access |
| 4.2 | Click on new Scenario | |
| 4.3 | Populate Search Field with Customer ID Details 1000000001 | if resultList is nonEmpty continue else Exit Code 002 – Incorrect Details |
| 4.4 | Select Customer which match up details | |
| 4.5 | Navigate to MyClient → Cards; Check for Card No | if Card is Found continue else Exit Code 002 – Incorrect Details |
| 4.6 | Select Active Card 1101-1000-1000-1000 | |
| 4.7 | Attach Test Transaction from AdminTestAccount | |
| 4.8 | Select Test Transaction Type option as Debit | |
| 4.9 | Choose Payment Option as Card | if Payment is Success continue to Step 12 else (check if AttemptFlag is set goto Step 11 else goto Step 10) |
| 4.10 | AttemptFlag=0 | if AttemptFlag<3 continue to Step 4.7 else Exit Code 002 – Incorrect Details |
| 4.11 | AttemptFlag+=1 | |
| 4.12 | Go to Home Page | |
| 4.13 | Navigate to MyClient → Cards | |
| 4.14 | Select Active Card 1101-1000-1000-1000 | if Card is Found continue else Exit Code 002 – Incorrect Details |
| 4.15 | Select View Transaction History | Check Condition: if recentTransaction is not from AdminTestAccount Exit with status Failed else Exit with Status Success |
| 4.16 | Submit | |

FIG. 20

Defect 5

Defect Description - Credit Type Transactions not getting Updated in Account Transaction History for Account 000010000 for CID 1000000011

| | Reproduction Step Description | Conditions |
|---|---|---|
| 5.1 | Enter Admin Account as Super User | If Login is Successful continue else Exit Code 001 – Unauthorized Access |
| 5.2 | Click on new Scenario | |
| 5.3 | Populate Search Field with Customer ID Details 1000000011 | If resultList is not Empty continue else Exit Code 002 – Incorrect Details |
| 5.4 | Select Customer which match up details | |
| 5.5 | Navigate to MyClient → MyAccounts Check for Acc No | If Account is Found continue else Exit Code 002 – Incorrect Details |
| 5.6 | Select Account 000010000 | |
| 5.7 | Attach Test Transaction from AdminTestAccount | |
| 5.8 | Select Test Transaction Type option as Credit | If Payment is Success continue to Step 5.12 else {check if AttemptFlag is set goto Step 5.11 else goto Step 5.10} |
| 5.9 | AttemptFlag=0 | If AttemptFlag<3 continue to Step 5.7 else Exit Code 002 – Incorrect Details |
| 5.10 | AttemptFlag+=1 | |
| 5.11 | Navigate to Home Page | |
| 5.12 | Navigate to MyClient → MyAccounts | If Account is Found continue else Exit Code 002 – Incorrect Details |
| 5.13 | Select Active Account 000010000 | |
| 5.14 | Select View Transaction History | Check Condition: if recentTransaction is not from AdminTestAccount Exit with status Failed else Exit with Status Success |
| 5.15 | Submit | |

FIG. 22

Defect 6

Defect Description – Current Outstanding Balance not getting updated for payments Credit Card 2010-2000-2000-2010 for CID 1010010001

| | Reproduction Step Description | Conditions |
|---|---|---|
| 6.1 | Login as Super User to Admin Account | if Login is Successful continue else Exit Code 001 – Unauthorized Access |
| 6.2 | Create a new Scenario | |
| 6.3 | Type Customer ID as 1010010001 in Search Field | If resultList is nonEmpty continue else Exit Code 002 – Incorrect Details |
| 6.4 | Customer of equivalent matching details to be selected | |
| 6.5 | Navigate to MyClient → Cards; Check for Card No. | If Card is Found continue else Exit Code 002 – Incorrect Details |
| 6.6 | Select Active Card 2010-2000-2000-2010 | |
| 6.7 | Update temp Variable as Current Outstanding Balance | |
| 6.8 | Attach Test Transaction from AdminTestAccount | |
| 6.9 | Select Test Transaction Type option as Credit | if Payment is Success continue to Step 6.12 else {check if AttemptFlag is 0 goto Step 6.11 else goto Step 6.10} |
| 6.10 | AttemptFlag=0 | |
| 6.11 | AttemptFlag+=1 | if AttemptFlag<3, continue to Step 6.8 else Exit Code 002 – Incorrect Details |
| 6.12 | Click on Home Page | |
| 6.13 | Click through MyClient → Cards | If Card is Found continue else Exit Code 002 – Incorrect Details |
| 6.14 | Select Active Card 2010-2000-2000-2010 | |
| 6.15 | Submit | Check Condition: if CurrentOutstandingBalance >= temp Exit with status Failed else Exit with Status Success |

FIG. 24

| Step representation | Description | Execution Details / Steps from log |
|---|---|---|
| S.1 | Enter Admin Account as Super User | • Enter Admin Account as Super User {from defect [1.1, 4.1, 5.1]}<br>• Login as Super User to Admin Account {from defect [2.1]}<br>• Login to Admin Account (Super User) {from defect [3.1]}<br>• Login as Super User to Admin Account {from defect [6.1]} |
| S.2 | Create new Scenario | • Click on new Scenario {from defect [1.2, 4.2, 5.2]}<br>• Create a new Scenario {from defect [2.2, 3.2, 6.2]} |
| S.3 | Type Customer ID as XXX in Search Field | • Populate Search Field with Customer ID Details: 1000000000 {from defect [1.3]}<br>• Type Customer ID as 0100000001 in Search Field {from defect [2.3]}<br>• Populate Customer id Details as 0000000001 in Search Field {from defect [3.3]}<br>• Populate Search Field with Customer ID Details: 1000000001 {from defect [4.3]}<br>• Populate Search Field with Customer ID Details: 1000000011 {from defect [5.3]}<br>• Type Customer ID as 1010010001 in Search Field {from defect [6.3]} |
| S.4 | Select Customer which matching details | • Select Customer which match up details {from defect [1.4, 4.4, 5.4]}<br>• Customer of equivalent matching details to be selected {from defect [2.4, 6.4]}<br>• Choose Customer Account with matching Details {from defect [3.4]} |
| S.5 | Navigate to MyClient → MyAccounts; Check for Acc No. | • Navigate to MyClient → MyAccounts; Check for Acc No {from defect [1.5, 1.13, 5.5, 5.12]} |
| S.6 | Navigate to MyClient → Cards; Check for Card No. | • Click through MyClient → Cards; Check for Card; {from defect [2.5, 2.15, 3.5, 6.13]}<br>• Navigate to MyClient → Cards; Check for Card No {from defect [4.5, 4.13, 5.5, 6.5]} |
| S.7 | Select Account XXX | • Select Account 000010000 {from defect [1.6]}<br>• Select Active Account with Account Number 000010000 {from defect [1.14]}<br>• Select Account 000010001 {from defect [5.6, 5.13]} |
| S.8 | Select Active Card XXX | • Select Active Card with Card Number 2000-2000-2000-2000 {from defect [2.6, 2.14]}<br>• Select Active Card 1000-1000-1000-1000 {from defect [3.6]}<br>• Select Active Card 1101-1000-1000-1000 {from defect [4.6, 4.14]}<br>• Select Active Card with Card Number 2010-2000-2000-2010 {from defect [6.6]} |

FIG. 26

| Step Representation | Description | Sample Points from Log |
|---|---|---|
| S 9 | Attach Test Transaction from AdminTestAccount | • Add Test Transaction from AdminTestAccount {from defect [1.7]}<br>• Attach Test Transaction from AdminTestAccount {from defect [2.8, 4.7, 5.7, 6.1, 6.8]} |
| S 10 | Select Test Transaction Type option as Credit | • Select Test Transaction Type option as Credit {from defect [3.8, 6.9]} |
| S 11 | Select Test Transaction Type option as Debit | • Select Test Transaction Type option as Debit {from defect [1.8, 2.9, 4.8]} |
| S 12 | Select Payment Option as XXX | • Select Payment Option as Account; {from defect [1.9,]}<br>• Select Payment Option as Card; {from defect [4.9]}<br>• Select Payment Option as Reward Points {from defect [2.10]} |
| S 13 | AttemptFlag=0 | • AttemptFlag=0 {from defect [1.10, 2.11, 4.10, 5.9, 6.10]} |
| S 14 | AttemptFlag++ | • AttemptFlag++ {from defect [1.11, 2.12, 4.11, 5.10, 6.11]} |
| S 15 | Update temp Variable as XXX | • Update temp Variable as Current OutStanding Balance {from defect [1.12]} |

*FIG. 27*

Defect 4

Defect 3

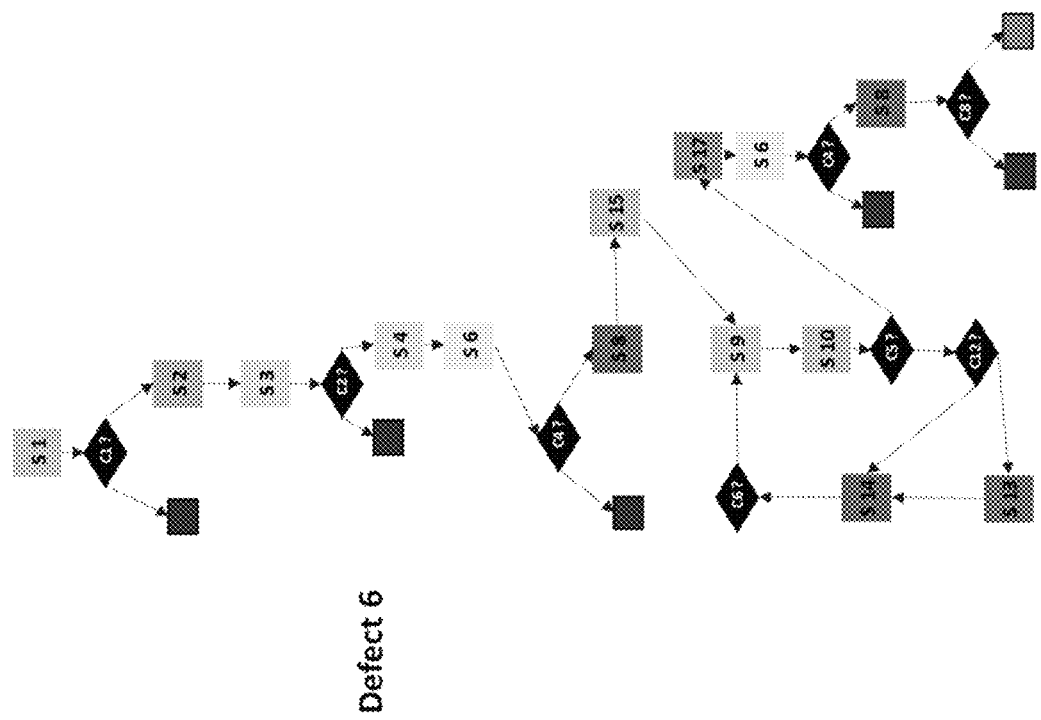

New Defect Reproduction Steps

Defect Description - Active Reward Points not getting updated for Credit Card 2010-2000-2000-2010 for CID 010010001

| | Reproduction Step Description | Conditions |
|---|---|---|
| 1 | Login as Super User to Admin Account | If Login is Successful continue else Exit Code 001 – Unauthorized Access |
| 2 | Create a new Scenario | |
| 3 | Type Customer ID as 010010001 in Search field | If resultList is nonEmpty continue else Exit Code 002 – Incorrect Details |
| 4 | Customer of equivalent matching details to be selected | |
| 5 | Navigate to MyClient → Cards; Check for Card No. | If Card is Found continue else Exit Code 002 – Incorrect Details |
| 6 | Select Active Card 2010-2000-2000-2010 | |
| 7 | Go to Cards → Reward Points | |
| 8 | Attach Test Transaction from AdminTestAccount | |
| 9 | Select Test Transaction Type option as Credit | If Payment is Success continue to Step 13 else (check if Attempting is set goto Step 12 else goto Step 9) |
| 10 | AttemptFlag=0 | If AttemptFlag<3 continue to Step 7 else goto Exit Code 002 – Incorrect Details |
| 11 | AttemptFlag+=1 | |
| 12 | Navigate to Home Page | |
| 13 | Click through MyClient → Cards | If Card is Found continue else Exit Code 002 – Incorrect Details |
| 14 | Select Active Card 2010-2000-2000-2010 | Check Condition: if Active Reward Points >= temp Exit with status: Failed else Exit with Status Success |
| 15 | Submit | |

NOTE: Parameters derived from and specific to defect description are shown in black boxes 

*FIG. 39*

New Defect Reproduction Steps through Interactive Learning

Defect Description – Active Reward Points not getting updated for Credit Card 2010-2000-2000-2010 for CID 010010001

| | Reproduction Step Description | Conditions |
|---|---|---|
| 1 | Login as Super User to Admin Account | If Login is Successful continue else Exit Code 001 – Unauthorized Access |
| 2 | Create a new Scenario | |
| 3 | Type Customer ID as 010010001 in search Field | If resultList is nonEmpty continue else Exit Code 002 – Incorrect Details |
| 4 | Customer of equivalent matching details to be selected | |
| 5 | Navigate to MyClient → Cards, Check for Card No. | If Card is Found continue else Exit Code 002 – Incorrect Details |
| 6 | Select Active Card 2010-2000-2000-2010 | |
| 7 | Go to Cards → Reward Points | |
| 8 | Update temp Variable as Active Reward Points | |
| 9 | Attach Test Transaction from AdminTestAccount | If Payment is Success continue to Step 13 else (check if AttemptFlag is set goto Step 12 else goto Step 9) |
| 10 | Select Test Transaction Type option as Credit | |
| 11 | AttemptFlag=0 | If AttemptFlag<3 continue to Step7 else goto Exit Code 002 – Incorrect Access |
| 12 | AttemptFlag+=1 | |
| 13 | Navigate to Home Page | |
| 14 | Click through MyClient → Cards | If Card is Found continue else Exit Code 002 – Incorrect Details |
| 15 | Go to Cards → Reward Points | |
| 16 | Select Active Card 2010-2000-2000-2010 | |
| 17 | Go to Cards → Reward Points | If flag is True go to step 18 else continue |
| 18 | Submit | Check Condition if Active Reward Points = temp Exit with Status Failed else Exit with Status Success |

Note – Text in yellow box shows steps chosen by user through interactive learning

*FIG. 41*

Test 1

| | Test Objective: [illegible] |
|---|---|
| Test-Data | Account Number = 000010030<br>CID = 100000000 |
| Step 1 | Enter Admin Account as Super User |
| Step 2 | Click on new Scenario |
| Step 3 | Search for details with CID 100000000 |
| Step 4 | Select Customer which match up details |
| Step 5 | Navigate to MyClient with option MyAccounts |
| Step 6 | Select Account Number 000010030 |
| Step 7 | Attach Test Transaction from AdminTestAccount |
| Step 8 | Select Test Transaction Type option as Debit |
| Step 9 | Select Payment Option as Account |
| Step 10 | Navigate to Home Page |
| Step 11 | Navigate to MyClient with option MyAccounts |
| Step 12 | Select Active Account with Account Number 000010030 |
| Step 13 | Select View Transaction History | Check Condition: if recent Transaction is not from AdminTestAccount Yes: Report "Defect found" No: Report "no defect detected" |
| Step 14 | Submit |

NOTE: Parameters derived from test objective and test data are shown in black boxes.

FIG. 42

Test 2

| | Pre-Condition: Test Data should be available to execute the Test, otherwise fetch from Database. |
|---|---|
| Test-Data | Credit Card Number = 2000-2000-2000-2000<br>CID = 010000001 |
| Step 1 | Login as Super User to Admin Account |
| Step 2 | Create a new Scenario |
| Step 3 | Enter Customer ID as  010000001  in Search Field |
| Step 4 | Select account is found then select Customer Details |
| Step 5 | Select MyClient and then select Cards |
| Step 6 | Check Active Credit Card Number  2000-2000-2000-2000  |
| Step 7 | Go to Cards and then Reward Points |
| Step 8 | If (Reward Points < K) Return with Fail Status and Exit |
| Step 9 | Else Go Back to Cards tab |
| Step 10 | Attach Test Transaction from AdminTestAccount |
| Step 11 | Select Test Transaction Type option as Debit |
| Step 12 | Select Payment Option as  Reward Points  |
| Step 13 | Navigate to Home Page |
| Step 14 | Click MyClient and then select Cards |
| Step 15 | Select if Active Card is  2000-2000-2000-2000  |
| Step 16 | Select My Points and then select Purchase History |
| | Check Condition: if (recent TransactionStatus is from AdminTestAccount is Failed) then (Report "Defect found") else (Report "no Defect detected") |
| Step 17 | Submit |

FIG. 43

Test 3

| Test-Data | Credit Card Number = 9000-2000-9000-2000<br>CID = 1100000000 | |
|---|---|---|
| Step 1 | Enter Admin Account as Super User | |
| Step 2 | Select New Scenario | |
| Step 3 | Enter Customer ID Details as 0100000000 in Search Field | |
| Step 4 | Select Customer with matching Details | |
| Step 5 | Navigate to MyClient and then select Cards | |
| Step 6 | Select Active Card 9000-2000-9000-2000 | |
| Step 7 | Navigate to Cards and then select Reward Points | |
| Step 8 | If (Reward Points <K) Return with Fail Status and Exit | |
| Step 9 | Else Go Back to Cards tab | |
| Step 10 | Add Test Transaction from AdminTestAccount | |
| Step 11 | Select Test Transaction Type option as Debit | |
| Step 12 | Select Payment Option as Reward Points | |
| Step 13 | Navigate to Home Page | |
| Step 14 | Click MyClient and then select Cards | |
| Step 15 | Select Active Card 9000-2000-9000-2000 | |
| Step 16 | Select My Points and then select Purchase History | Check Condition: if (recent Transaction Status is from AdminTestAccount) then {Report "Defect found"} else {Report "no-Defect detected"} |
| Step 17 | Submit | |

FIG. 44

Test 4

| Test Procedure | Test Credit Card Transaction History Retrieval |
|---|---|
| Test-Data | Credit Card Number = 1000-1000-1000-1000<br>Customer ID = 0000000001 |
| Step 1 | Login to Admin Account (Super User) |
| Step 2 | Create a new Scenario |
| Step 3 | Populate Customer Id Details as 0000000001 in Search Field |
| Step 4 | Choose Customer Account Details 0000000001 |
| Step 5 | Navigate to MyClient and then select Cards |
| Step 6 | Select Active Card with Card Number |
| Step 7 | Select View Transaction History 1000-1000-1000-1000 | Check Condition: if (Transaction history is None) then (1. make db call to select from transaction DB 2. if (resultSet is empty) {Report "Defect found"} else {Report "no Defect detected"}) |
| Step 8 | Submit |

FIG. 45

Test 5

| Test Objective | Test if Bank Efficiently Works on Customer Search and Transaction History |
|---|---|
| Test-Data | Credit Card Number = 0100-0100-0100-0100<br>CID = 1100100000 |
| Step 1 | Login Admin Account with Super User access |
| Step 2 | Click on a New Scenario |
| Step 3 | Enter Customer ID Details as 1100100000 in Search Field |
| Step 4 | Select if Customer record is found |
| Step 5 | Click on MyClient and then select Cards |
| Step 6 | Select Active Card Number 0100-0100-0100-0100 |
| Step 7 | Click on View Transaction History |
| Step 8 | Apply Filter Date | Check Condition: If (Transaction History is Empty) then<br>1. Make db call to select from transaction DB<br>2. If (resultSet is Empty) then (Report "Defect found")<br>3. Else (Report "no Defect detected") |
| Step 9 | Submit |

FIG. 46

LEARNING BASED INCIDENT OR DEFECT RESOLUTION, AND TEST GENERATION

PRIORITY

This application is a Non-Provisional application of commonly assigned and Indian Provisional Application Serial Number 201711032766, filed Sep. 15, 2017, the disclosure of which is hereby incorporated by reference in its entirety.

BACKGROUND

In an enterprise environment, different processes may encounter different types of incidents or defects during operation. An incident may represent any type of event that needs to be addressed as part of operation of a process. A defect may represent an incorrect operation of the process. When an incident or defect occurs, a ticket may be generated, and the ticket may include a description of the incident or defect. Once the incident or defect is resolved, the ticket may be marked as closed.

BRIEF DESCRIPTION OF DRAWINGS

Features of the present disclosure are illustrated by way of example and not limited in the following figure(s), in which like numerals indicate like elements, in which:

FIGS. 5-9 illustrate historical defects to illustrate operation of the learning based incident or defect resolution, and test generation apparatus of FIG. 1 in accordance with an example of the present disclosure;

FIGS. 14-25 illustrate defects and corresponding incident action graphs to illustrate operation of the learning based incident or defect resolution, and test generation apparatus of FIG. 1 in accordance with an example of the present disclosure;

FIGS. 26-28 illustrate step normalization to illustrate operation of the learning based incident or defect resolution, and test generation apparatus of FIG. 1 in accordance with an example of the present disclosure;

FIGS. 30-35 illustrate incident action graphs for the defects of FIGS. 14-25 to illustrate operation of the learning based incident or defect resolution, and test generation apparatus of FIG. 1 in accordance with an example of the present disclosure;

FIGS. 37-41 illustrate new defect reproduction to illustrate operation of the learning based incident or defect resolution, and test generation apparatus of FIG. 1 in accordance with an example of the present disclosure;

FIGS. 42-46 illustrate system testing to illustrate operation of the learning based incident or defect resolution, and test generation apparatus of FIG. 1 in accordance with an example of the present disclosure;

DETAILED DESCRIPTION

Figure 1:
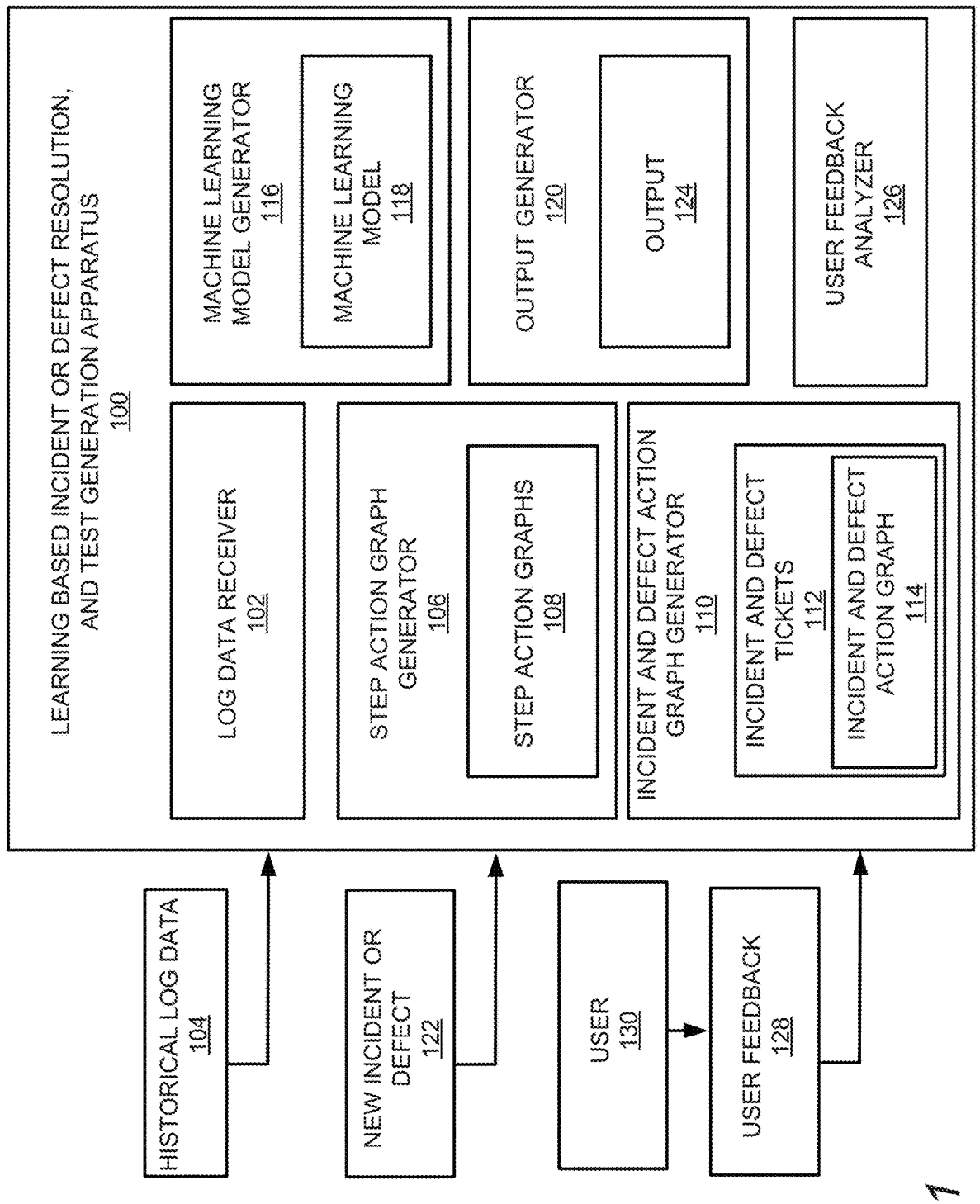
FIG. 1 illustrates a layout of a learning based incident or defect resolution, and test generation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Learning based incident or defect resolution, and test generation apparatuses, methods for learning based incident or defect resolution, and test generation, and non-transitory computer readable media having stored thereon machine readable instructions to provide learning based incident or defect resolution, and test generation are disclosed herein.

With respect to incident and defect resolution, successful maintenance or testing of an application when being used in practice (or under testing) can be technically challenging.

For example, aberrations in the expected behavior of an application may result in incidents (or defects) that are raised by users. For example, a user may raise an incident by generating an incident ticket. The incidents may also be raised by monitoring modules. An incident (or defect) management process may include the timely resolution of these incidents (or defects). If the incidents (or defects) are not timely resolved, such failure to meet time constraints may result in penalties, and may negatively affect the operation of a process.

With respect to incident and defect management, it is technically challenging to devise and perform a sequence of actions in order to be able to either reproduce an error that results in a defect, identify a root cause of an incident or defect, or resolve an incident or defect. In this regard, identification of sequences of actions that need to performed is technically challenging because key details of incidents (or defects) as recorded may appear as plain-text descriptions or violations of rules prescribed for monitoring tools. Such descriptions may require subjective extensive analysis to be able to reuse the descriptions, which can result in inconsistent results with respect to incident (or defect) resolution.

The apparatuses, methods, and non-transitory computer readable media disclosed herein address at least the aforementioned technical challenges by analyzing historical incident (or defect) data, such as, plain text descriptions of the incidents (or defects), and extracting patterns underlying sequences of steps performed to reproduce incidents (or defect), identify root causes, and resolve incidents (or defects) indicating underlying inter dependent actions. Further, the apparatuses, methods, and non-transitory computer readable media disclosed herein provide for learning based incident or defect resolution, and test generation by matching recent incident (or defect) data with patterns latently present in historical data, and providing suggestions to end users on which sequences of steps may be potentially performed (together with control flow structure) in order to reproduce an incident (or defect), identify its root cause, or resolve the incident (or defect). The apparatuses, methods, and non-transitory computer readable media disclosed herein also provide for learning based incident or defect resolution, and test generation that includes continuous learning from user interactions.

The apparatuses, methods, and non-transitory computer readable media disclosed herein may be applicable to a variety of technical areas. For example, reported incidents (or defects) related to malfunctioning of an application may require identification of a root cause and/or resolution of an underlying problem by deciding to perform a set of steps, and analyzing results in a controlled manner. For example, the apparatuses, methods, and non-transitory computer readable media disclosed herein may provide for matching with expected outputs and performance of conditional decisions. For example, an incident and/or defect description may indicate "AppJCX incorrectly estimating prorate to day refund amount for renewed contracts". In this regard, the resolution steps (or steps to reproduce the incident or defect) may include login to AppJCX, selection of the feature renew contract and ProRate_TaxCalculator assigned, selection of a customer, selection of Contract identification (ID) as JAN-MDR240517, navigation to a renew information tab and actuation, and selection of YES when asked for confirmation.

Given a description of an incident or a defect, the apparatuses, methods, and non-transitory computer readable media disclosed herein may provide technical solutions to technical problems that include, for example, identification of a set of steps (or actions), which need to be performed in order to be able to either reproduce an incident (or defect), identification of a root cause of the incident (or defect), and/or resolution of the incident (or defect).

The apparatuses, methods, and non-transitory computer readable media disclosed herein may provide a learning based approach to recommend a set of actions required to be performed/executed, together with a control flow structure to specify how to perform the set of actions.

The apparatuses, methods, and non-transitory computer readable media disclosed herein may provide for identification of action sequences to enable faster closure of incidents and defect resolution.

The apparatuses, methods, and non-transitory computer readable media disclosed herein may be applicable to any application domain wherein meeting objective(s) involves selection of a set of predefined actions in a controlled manner. For example, the apparatuses, methods, and non-transitory computer readable media disclosed herein may be applicable to application maintenance (AM), defect management (DM), virtual assistive agents, early closure, etc.

The apparatuses, methods, and non-transitory computer readable media disclosed herein may provide for reduced penalties associated with incident and/or defect resolution in that deeper analysis of recent incidents/defects (for root cause identification) in view of historical incident/defect data may prevent possible escalations, and thus reduce penalties or added costs.

The apparatuses, methods, and non-transitory computer readable media disclosed herein may provide for deeper understanding of underlying system dynamics in that identification of latent patterns present in the historical data and their partial matches in recent incidents/defects may provide a deeper understanding of the underlying system dynamics in the absence of other forms of a documented knowledge base. Thus, new users may enhance their learning with trial and error analysis of the outputs of the apparatuses, methods, and non-transitory computer readable media disclosed herein.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example learning based incident or defect resolution, and test generation apparatus (hereinafter also referred to as "apparatus 100").

Referring to FIG. 1, the apparatus 100 may include a log data receiver 102, executed by at least one hardware processor (e.g., the hardware processor 4802 of FIG. 48, or the hardware processor 5004 of FIG. 50), to ascertain historical log data 104 that includes incident or defect log data associated with operation of a process.

A step action graph generator 106, that is executed by the at least one hardware processor, is to generate, based on the historical log data 104, step action graphs 108.

An incident and defect action graph generator 110, that is executed by the at least one hardware processor, is to generate, based on grouping of the step action graphs 108 with respect to different incident and defect tickets 112, an incident and defect action graph 114 (hereinafter also referred to as incident action graph 114) for each of the incident and defect tickets 112.

A machine learning model generator 116, that is executed by the at least one hardware processor, is to generate a machine learning model 118 based on an analysis of the historical log data 104 with respect to each of the incident and defect action graphs corresponding to the incident and defect tickets 112.

An output generator 120, that is executed by the at least one hardware processor, is to generate, based on an analysis of the machine learning model 118 with respect to a new incident or defect 122, an output 124 that includes a sequence of actions to reproduce, for the new incident, steps that result in the new incident, reproduce, for the new defect, an error that results in the new defect, identify a root cause of the new incident or defect, and/or resolve the new incident or defect.

A user feedback analyzer 126 is to implement user feedback 128 driven continuous learning. In this regard, as disclosed herein, the user feedback analyzer 126 is to present suggested resolution steps (or steps to reproduce incidents) to a user 130.

Figure 2:
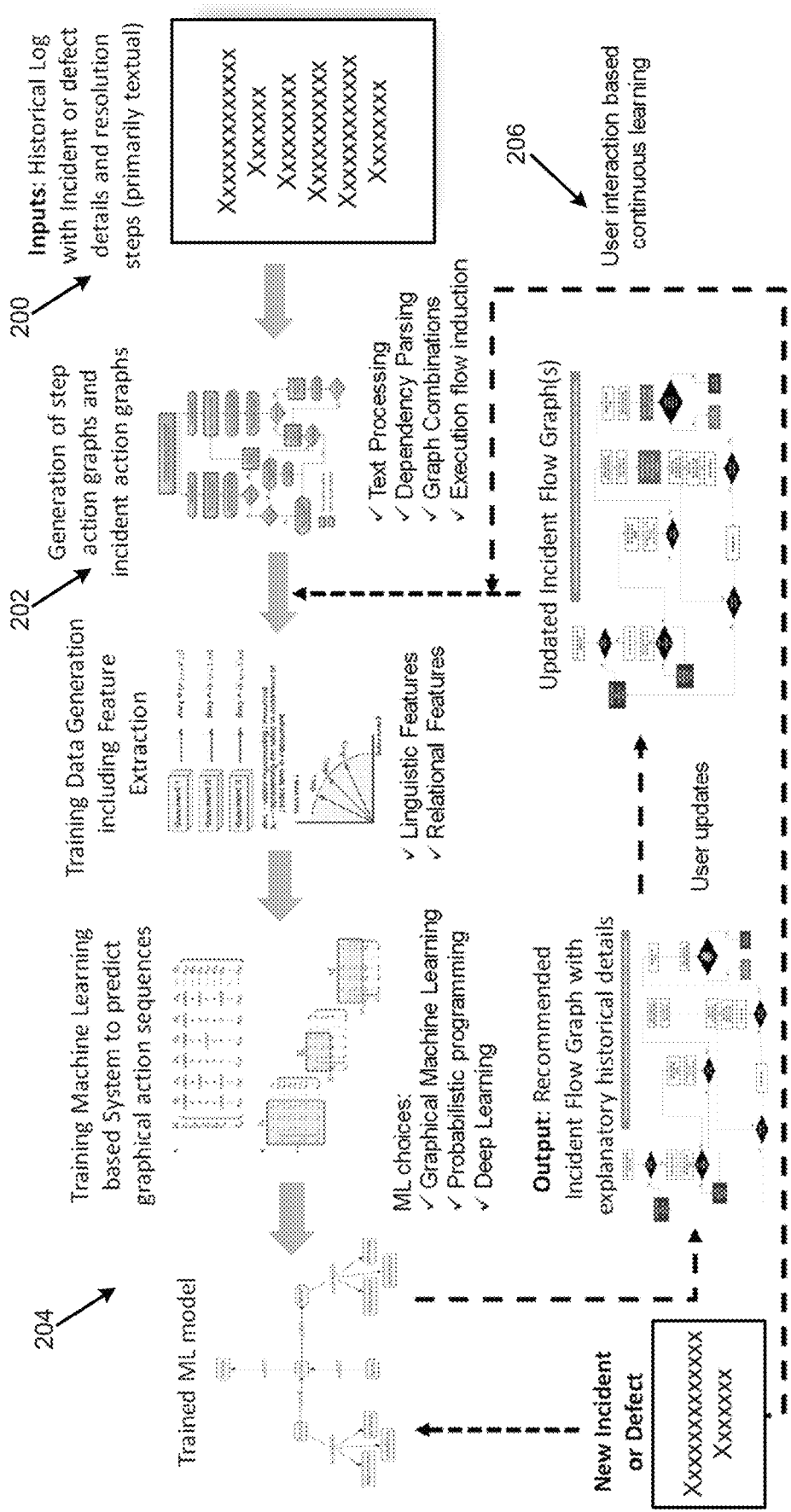
FIG. 2 illustrates a process flow with respect to the learning based incident or defect resolution, and test generation apparatus of FIG. 1 in accordance with an example of the present disclosure.

FIG. 2 illustrates a process flow with respect to the apparatus 100 in accordance with an example of the present disclosure.

Referring to FIG. 2, in order to identify (non-linear) graphical sequence of actions, at 200, the log data receiver 102 is to receive as input historical incident or defect log data (hereinafter also referred to as historical log data 104) with resolution notes and/or step, or steps to reproduce a defect. Further, the log data receiver 102 is to receive as input new incident or defect details (e.g., the new incident or defect 122).

At 202, the step action graph generator 106 is to generate step action graphs (SAGs) 108 from the resolution and reproduction log. In this regard, the step action graph generator 106 may generate, based on the historical log data, the step action graphs by analyzing, from the historical log data, data related to resolution of an incident or defect, and/or data related to reproduction of the incident or defect. Further, the step action graph generator 106 may transform, from the analyzed data, textual details from each step into the step action graphs by identifying action terms, subjects initiating the action terms, and objects associated with the actions terms. That is, for each ticket in the log, the step action graph generator 106 is to transform textual details from each step into a set of step action graphs 108 by identifying a set of action terms, subject(s) initiating those actions, and a set of objects associated (e.g., affected by) with these actions. The subject(s) initiating those actions may be implicit, and assumed to be the actual user of the apparatus 100, a defect fixer, and/or a tester.

Further, at 202, the incident and defect action graph generator 110 is to generate an incident action graph (IAG) 114. In this regard, the incident and defect action graph generator 110 may generate, based on grouping of the step action graphs with respect to different incident and defect tickets, the incident and defect action graph for each of the incident and defect tickets by analyzing, for the step action graphs, directed flow edges that identify sequences of actions. Further, the incident and defect action graph generator 110 may generate, based on grouping of the step action graphs according to the directed flow edges that identify the sequences of actions and with respect to the different incident and defect tickets, the incident and defect action graph for each of the incident and defect tickets. That is, the incident and defect action graph generator 110 is to connect step action graphs from all resolution steps for a ticket using directed flow edges indicating which actions need to be selected after each action, and how the actions need to be selected after each action. In this regard, the combined graph may be referred to as an incident action graph. The incident action graph 114 may also include conditional branching. The incident action graph may be labelled as outputs in the training data for the machine learning approach as disclosed herein, where other ticket details (e.g., brief description, detailed description, etc.) are to be used as input features.

At 204, a machine learning model generator 116 is to generate a machine learning model 118 to predict a set of actions with execution flow relationships. In this regard, the machine learning model generator 116 is to generate the machine learning model 118 to learn non-linear patterns of actions. As disclosed herein, the training data for the machine learning model 118 may include features extracted from defect/incident details in the log as inputs and incident action graphs as expected outputs. The trained machine learning model 118 may learn the latent patterns underlying ticket resolutions (or reproductions). In this regard, the output generator 120 may generate, based on the analysis of the machine learning model with respect to the new incident or defect, the output that includes the sequence of actions to reproduce, for the new incident, steps that result in the new incident, reproduce, for the new defect, the error that results in the new defect, identify the root cause of the new incident or defect, and/or resolve the new incident or defect by determining semantic relatedness between the new incident or defect, and incidents or defects, respectively, of the historical log data. Further, the output generator 120 may determine whether selection of a step from the historical log data causally constrains selection of a subsequent step from the historical log data. For example, the trained machine learning model 118 may learn to optimize constraining parameters for selection of steps including semantic relatedness between the new incident with those in the log, step to incident relatedness (e.g., how various steps are semantically relevant for the current incident), how selection of a previous step causally constraints selection of a next step, and how a sequence of past steps constrains choices for forthcoming sequences of actions.

At 206, the user feedback analyzer 126 is to implement user feedback 128 driven continuous learning. In this regard, the user feedback analyzer 126 may identify, in the generated output that includes the sequence of actions to reproduce, for the new incident, the steps that result in the new incident, reproduce, for the new defect, the error that results in the new defect, and/or resolve the new incident or defect, an incomplete feature of the generated output. The user feedback analyzer 126 may ascertain feedback with respect to the incomplete feature, and update, based on the feedback, the historical log data with respect to incomplete feature. The user feedback analyzer 126 may further update, the machine learning model based on an analysis of the updated historical log data. That is, the user feedback analyzer 126 is to present suggested resolution steps (or steps to reproduce incidents) to the user 130. The output may include specifically marked steps where explicit user input is required to complete an action (e.g., conditional branching decisions) since log details were not sufficient to complete details related to these steps. Incidents from the historical log, which may be semantically related to a current incident and include at least one step which is similar to steps in the output, may also be presented to the user 130 as explanatory support. The user 130 may update outputs by completing missing information at marked steps, by adding new steps, updating existing steps, and/or deleting steps. The user 130 may update supported incident details from the historical log data 104 (i.e., update incident action graphs which may have caused prediction of steps different from user expectations). In this regard, previous log details may be required to be updated in light of recent system level changes which were not captured in previous records. Such updates may be technically challenging to carryout offline, but would become feasible when the user learns that such previous log details are giving rise to incorrect learning for the machine learning model generator 116. The updates may be fed to a training data set for the machine learning model generator 116 by deleting previous records and adding updated records.

With respect to learning with modified details, the machine learning model 118 is to be retrained by the machine learning model generator 116 using the changed incident action graphs. In this regard, the user feedback analyzer 126 may generate a further incident and defect action graph with respect to the new incident or defect, and identify, with respect to the incomplete feature, a difference in an existing incident and defect action graph and the further incident and defect action graph. The user feedback analyzer 126 may continue iterations related to the update of the historical log data with respect to a further incomplete feature and the update of the machine learning model with respect to a further update to the historical log data until elimination of differences in existing incident and defect action graphs and further incident and defect action graphs related to the new incident or defect. That is, the retraining may be performed by first using modified incident action graphs corresponding to tickets in the historical log data 104. An incident action graph may be regenerated for the new ticket, and differences may be identified for the incident action graph which was earlier modified by the user 130. The list of steps where differences exist may be identified as L. All of those tickets from the historical log (modified from the last user interaction) which include steps in L may be identified. These tickets may be presented to the user 130 as potential causes for system learning to generate different outputs. The user 130 may again choose to update these ticket details (i.e., step level details). If the ticket details are updated, training may again be performed by the machine learning model generator 116 using the modified data set. This update of log data, regeneration of outputs for the new ticket, comparison with the user modified version, and selection of tickets from the log which may have caused differences for user modifications may continue until differences are eliminated, or the user 130 does not suggest any more modifications in the historical record. The new ticket details and the user modified incident action graph may be used as an additional data point for training for the machine learning model generator 116.

Figure 3:
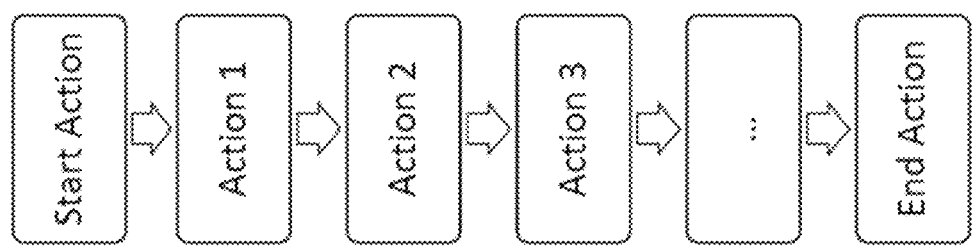
FIG. 3 illustrates action sequence prediction with respect to the learning based incident or defect resolution, and test generation apparatus of FIG. 1 in accordance with an example of the present disclosure.

FIG. 3 illustrates action sequence prediction with respect to the apparatus 100 in accordance with an example of the present disclosure.

Referring to FIG. 3, with respect to action sequence prediction, an objective includes identifying a sequence of actions to be performed to resolve a ticket or reproduce an underlying incident/defect using historical incident resolution logs as reference data. In this regard, technical challenges underlying the problem include determining start and end actions, determining an optimal sequence of intermediate steps which would begin with a start action as shown in FIG. 3 and close with an end action as shown in FIG. 3, and would be most relevant for the end user 130 as per the historical evidence present in the ticket log for the purpose of resolving an incident or reproducing underlying defects for root causes analysis.

Figure 4:
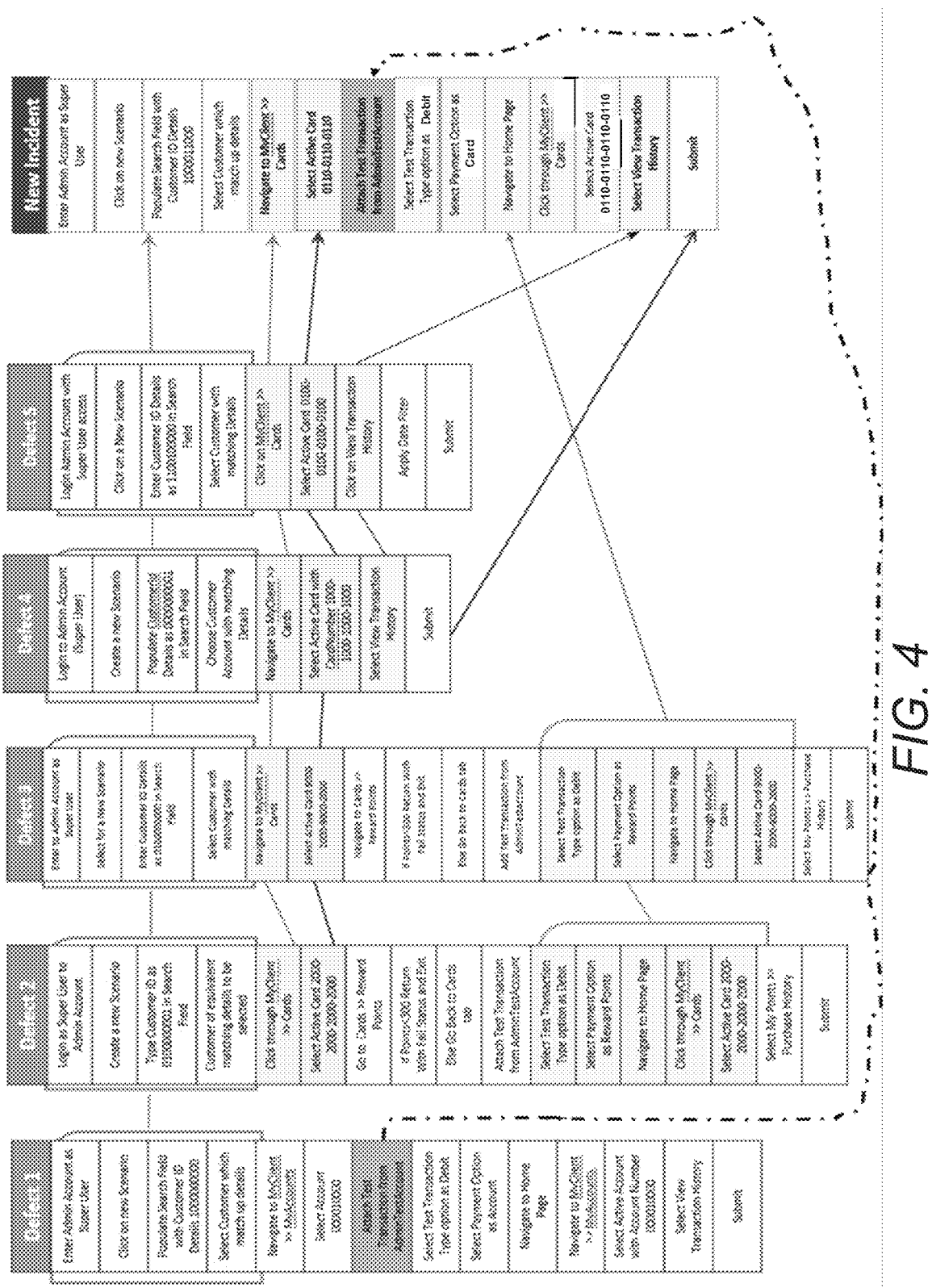
FIG. 4 illustrates a solution outline with respect to the learning based incident or defect resolution, and test generation apparatus of FIG. 1 in accordance with an example of the present disclosure.

FIG. 4 illustrates a solution outline with respect to the apparatus 100 in accordance with an example of the present disclosure.

Referring to FIG. 4, the solution outline may generally include implementation of supervised machine learning to infer sequential patterns of actions (e.g., "action sequence prediction"). With respect to training data (illustrated as Defect-1 to Defect-5), the training data may include historical log data 104 as training samples consisting of past ticket details and their corresponding resolutions consisting of sequences of actions. An output 124 may include a ranked sequence of actions with an expected relevance score as per a historical log database.

With reference to FIGS. 3 and 4, the selection of steps in the predicted sequence may be constrained by multiple factors. For example, the multiple factors may include semantic similarity between the new incident/defect with historical incidents/defects which is relevant for current selection. For example, for selection of start action as shown in FIG. 3, complete details may be used for similarity estimation whereas for an intermediate step (e.g., Action 1, Action 2, etc.), only partial matching may be required based upon how a potential next step in the historical log is related to underlying incidents/defects, and whether those incidents/defects are correspondingly related to the current incident/defect. The output generator 120 may determine whether selection of the step from the historical log data causally constrains selection of the subsequent step from the historical log data by determining a number of sequences where the step from the historical log data precedes the subsequent step from the historical log data. The output generator 120 may assign, based on the number of sequences, a degree of confidence to the step from the historical log data that precedes the subsequent step from the historical log data. For example, the multiple factors may include causal connections with previously selected steps. In this regard, a next step to be selected may include a relatively high evidence of being causally connected with earlier selection of steps. For example, if there are many past sequences where a current step follows earlier steps, such a current step may be selected as a candidate with a higher degree of confidence.

FIGS. 5-9 illustrate historical defects for the historical log data 104 to illustrate operation of the apparatus 100 in accordance with an example of the present disclosure. In this regard, a sequence of steps may be identified to simulate defects using details from Defect Logs or an Application Maintenance repository. The existing defect-log may include {Historical Defect 1, . . . , Historical Defect 5}. Further, the new defect-description may include "Unable to do debit type transactions from credit card on Card 0110-0110-0110-0110 for CID 1000011000".

Referring to FIGS. 5-9, historical defects 1-5 are illustrated. As shown in FIGS. 5-9, parameters derived from and specific to defect description may be shown in black boxes.

The historical defect of FIG. 5 may represent "Debit Type Transactions not getting Updated in Account Transaction History for Account 000010000 for CID 1000000000". The historical defect of FIG. 6 may represent "Unable to use reward points when greater than threshold 300 from Credit Card 2000-2000-2000-2000 for CID 010000001". In this regard, the threshold of 300 may represent an arbitrary/example amount. The historical defect of FIG. 7 may represent "Reward points history not getting updated on Credit Type Transactions from Credit Card 9000-2000-9000-2000 for CID 1100000000". The historical defect of FIG. 8 may represent "Credit Card Transaction History not visible for Card Number 1000-1000-1000-1000 and Customer ID 0000000001". The historical defect of FIG. 9 may represent "Date Filter not working on Card Transaction history on Credit Card 0100-0100-0100-0100 for CID 1100100000".

Figure 10:
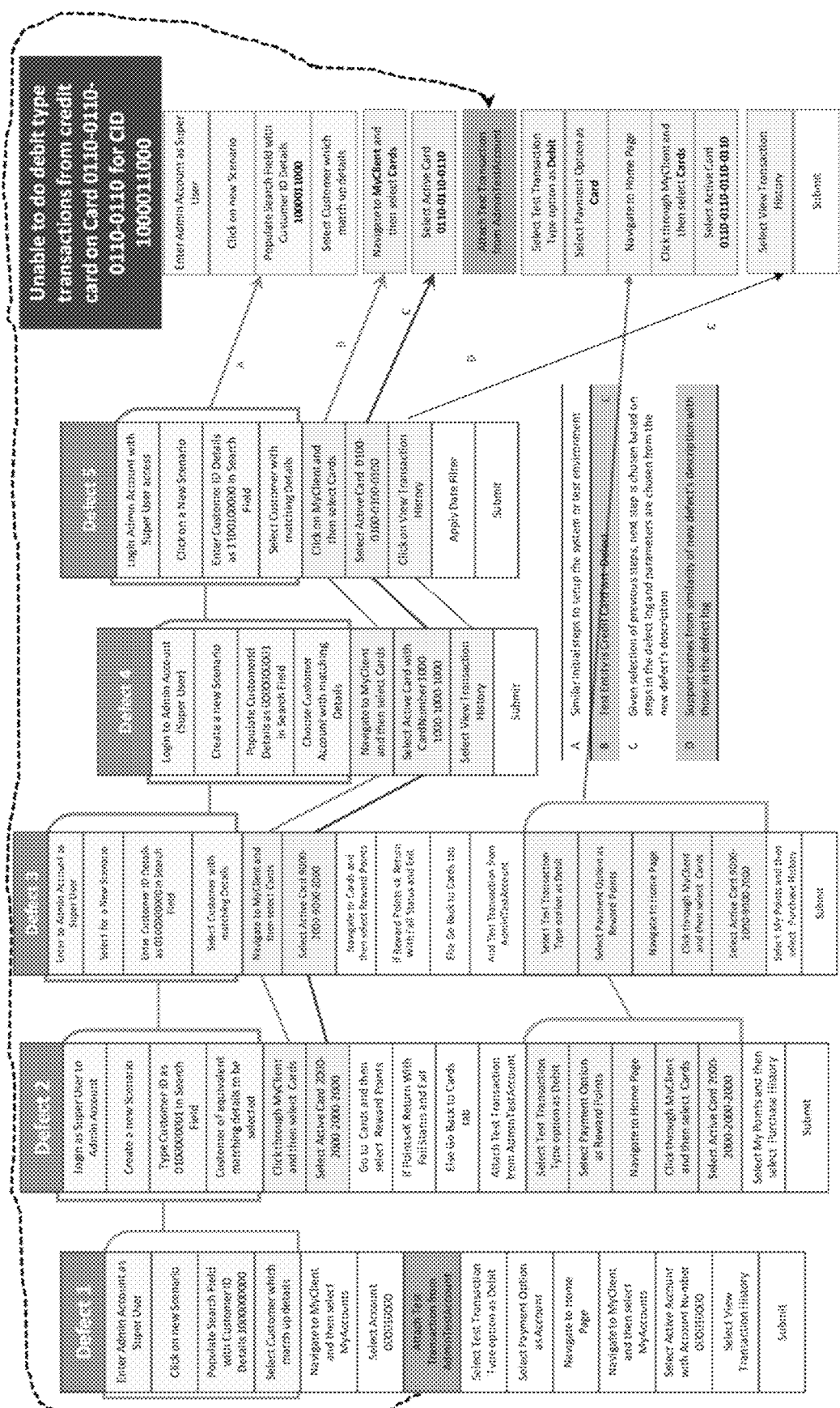
FIG. 10 illustrates further details with respect to the historical defects of FIGS. 5-9 to illustrate operation of the learning based incident or defect resolution, and test generation apparatus of FIG. 1 in accordance with an example of the present disclosure.

FIG. 10 illustrates further details with respect to the historical defects of FIGS. 5-9 to illustrate operation of the apparatus 100 in accordance with an example of the present disclosure.

Referring to FIG. 10, "A" may represent similar initial steps to setup the system or test environment, "B" may represent that the "Test Entity is Credit Card with respect to the Defect", "C" may represent that given selection of previous steps, the next step is chosen based on steps in the log and parameters are chosen from the defect description, and "D" may be used to indicate that support comes from similarity of the problem scenario in the defect description.

Figure 11:
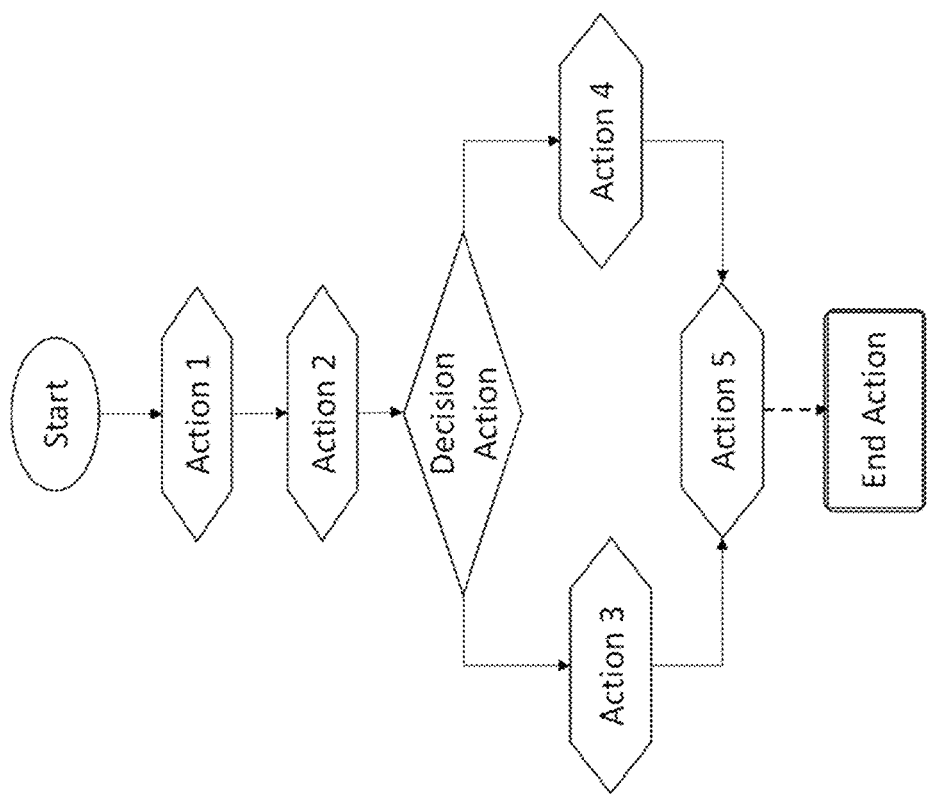
FIG. 11 illustrates graphical action sequence prediction with respect to the learning based incident or defect resolution, and test generation apparatus of FIG. 1 in accordance with an example of the present disclosure.

FIG. 11 illustrates graphical action sequence prediction with respect to the apparatus 100 in accordance with an example of the present disclosure.

Referring to FIG. 11, technical challenges with respect to graphical action sequence prediction may include identifying (nonlinear) graphical sequence of actions (i.e., set of actions together with control flow structure). In this regard, the technical challenges underlying the problem include determining start and end actions as shown in FIG. 11, and determining an optimal graphical structure of intermediate steps including control flow (branching structure) which is expected to be the most relevant for the end user as per the historical evidence present in the ticket log. In this regard, the machine learning model generator 116 may generate the machine learning model based on the analysis of the historical log data with respect to each of the incident and defect action graphs corresponding to the incident and defect tickets by learning non-linear patterns of actions to resolve an incident or defect from the historical log data. That is, as disclosed herein, the machine learning model generator 116 may implement a machine learning based solution framework to learn non-linear patterns of actions to resolve an incident from graph training data. The training data may include the historical log data 104 as training samples consisting of past tickets and their corresponding resolutions represented as an annotated directed graph.

As disclosed herein, the step action graph generator 106 is to transform each step in the historical log data 104 into a set of step action graphs 108 by identifying a set of action terms, subject(s) initiating those actions, and a set of objects associated (e.g., affected by) with the action.

Figure 12:
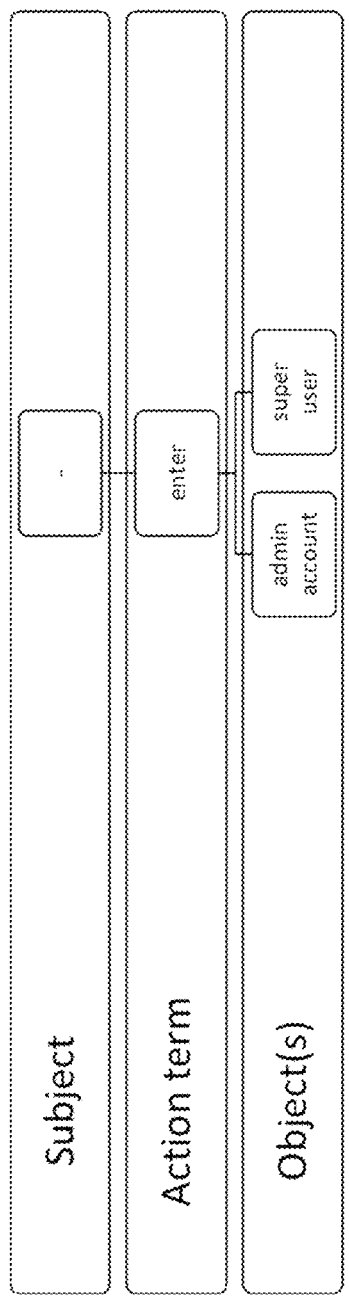
FIGS. 12 and 13 illustrate generation of step action graphs with respect to the learning based incident or defect resolution, and test generation apparatus of FIG. 1 in accordance with an example of the present disclosure.
Figure 13:
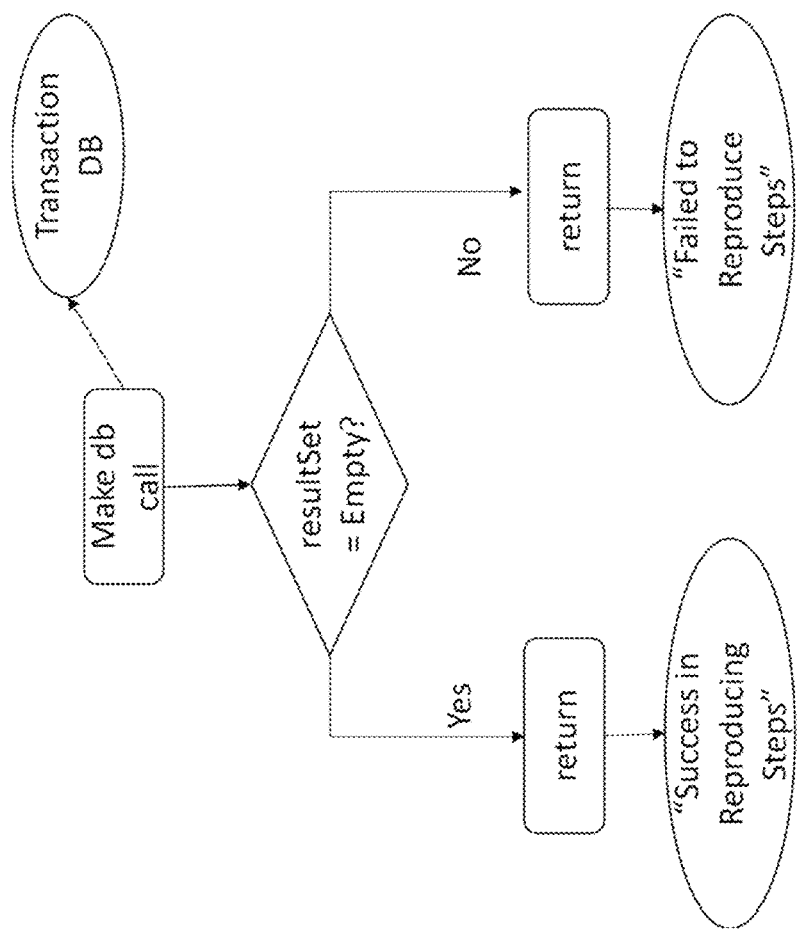

FIGS. 12 and 13 illustrate generation of step action graphs with respect to the apparatus 100 in accordance with an example of the present disclosure.

Referring to FIG. 12, for the phrase "Enter admin account as super user", subject, action term, and objects may be identified, where action term includes "enter", and objects include "admin account" and "super user". The subject in this case may be implicit (e.g., the actual user of the apparatus 100, a defect fixer, and/or a tester).

Referring to FIG. 13, the step action graph generator 106 may generate, based on the historical log data, the step action graphs by identifying adjacent action terms, and joining nodes related to the adjacent action terms by sequential flow edges. That is, the step action graphs from all resolution steps for a ticket may be connected by control flow edges by applying the following criteria. For example, if action A2 appears right after action A1, join action nodes A1 and A2 by sequential flow edges: A1→A2. The step action graph generator 106 may generate, based on the historical log data, the step action graphs by identifying conditionally related action terms, and joining nodes related to the conditionally related action terms by conditional branching. That is, if actions A2 or A3 are conditionally dependent on outcome of action A1, join action A1 with condition node, and then join action A2 and A3 by conditional branching. The combined graph may be referred to as the incident action graph 114. For example, for the incident action graph 114 of FIG. 13, step 1 includes "make db call to transaction DB", step 2 includes "if resultSet is nonempty, return 'Success in Reproducing Steps' Else return 'Failed to Reproduce Steps'", etc.

These incident action graphs may be labelled as outputs in the training data for the machine learning model generator 116 as disclosed herein, where other ticket details (e.g., brief description, detailed description, etc.) may be used as input features.

For a new ticket (e.g., a new incident or defect), the user 130 may be presented the output 124 with predicted graphical sequence of actions either as incident action graph (e.g., predicted incident action graph) or as a set of action descriptions (as originally present in the incident resolution log). The user 130 may also be presented with supporting details. For example, the supporting details may identify tickets from the historical log data 104 that are semantically similar to the current ticket, and a ranking of the identified tickets in order of decreasing similarity scores. If there are k steps (with corresponding representations as step action graphs) in the predicted incident action graph, the top 2 k similar tickets may be selected from the historical log data 104. For each of these k step action graphs included in the predicted incident action graph, those tickets, where this step action graph appears, may be identified. If a step action graph does not appear in the top 2 k similar incidents, from the sorted list, the first ticket where the step action graph is present may be selected. The user 130 may choose to update the predicted incident action graph as well as other supporting incident action graphs from the historical log data 104.

With respect to user feedback driven continuous learning, the machine learning model 118 may be retrained by using the changed incident action graphs as provided by the user 130. The retraining may be initially performed by using modified incident action graphs corresponding to tickets in the historical log data 104. An incident action graph may be regenerated for the new ticket, and differences with the incident action graph which was earlier modified by the user 130 may be identified. In this regard, as disclosed herein, L may be designated as the list of steps where differences exist. Further, as disclosed herein, all those tickets from the historical log data 104 (modified from last user interaction) which include steps in L may be identified. These tickets may be presented to the user 130 as potential causes for system learning to generate different outputs. The user 130 may again choose to update these ticket details (i.e., step level details), and if so, training may again be performed using the modified data set. As disclosed herein, this update of log data, regeneration of outputs for the new ticket (e.g., the new incident or defect 122), comparison with the user modified version, and selection of tickets from the log which might have caused differences for user modifications, may continue until differences are eliminated or the user 130 does not suggest any modifications in the historical log data 104. New ticket details together with the user modified incident action graph may be utilized as an additional data point for training for the machine learning model generator 116.

FIGS. 14-25 illustrate defects and corresponding incident action graphs to illustrate operation of the apparatus 100 in accordance with an example of the present disclosure.

The defect of FIG. 14 may represent "Debit Type Transactions not getting Updated in Account Transaction History for Account 000010000 for CID 1000000000". The defect of FIG. 16 may represent "Unable to use reward points when greater than threshold 300 from Credit Card 2000-2000-2000-2000 for CID 010000001". In this regard, the threshold of 300 may represent an arbitrary/example amount. The defect of FIG. 18 may represent "Credit Card Transaction History not visible for Card Number 1000-1000-1000-1000 and Customer ID 0000000001". The defect of FIG. 20 may represent "Debit Type Transactions not getting Updated in Account Transaction History for Card 1101-1000-1000-1000 for CID 1000000001". The defect of FIG. 22 may represent "Credit Type Transactions not getting Updated in Account Transaction History for Account 000010000 for CID 1000000011". The defect of FIG. 24 may represent "Current Outstanding Balance not getting updated for payments Credit Card 2010-2000-2000-2010 for CID 1010010001".

Referring to FIG. 14, the reproduction steps for the Defect-1 are listed at 1.1 to 1.16. These reproduction steps may be ascertained, for example, from historical user input. Conditions associated with a reproduction step are also listed in FIG. 14. FIGS. 16, 18, 20, 22, and 24 similarly indicate reproduction steps for the corresponding defects.

Figure 15:
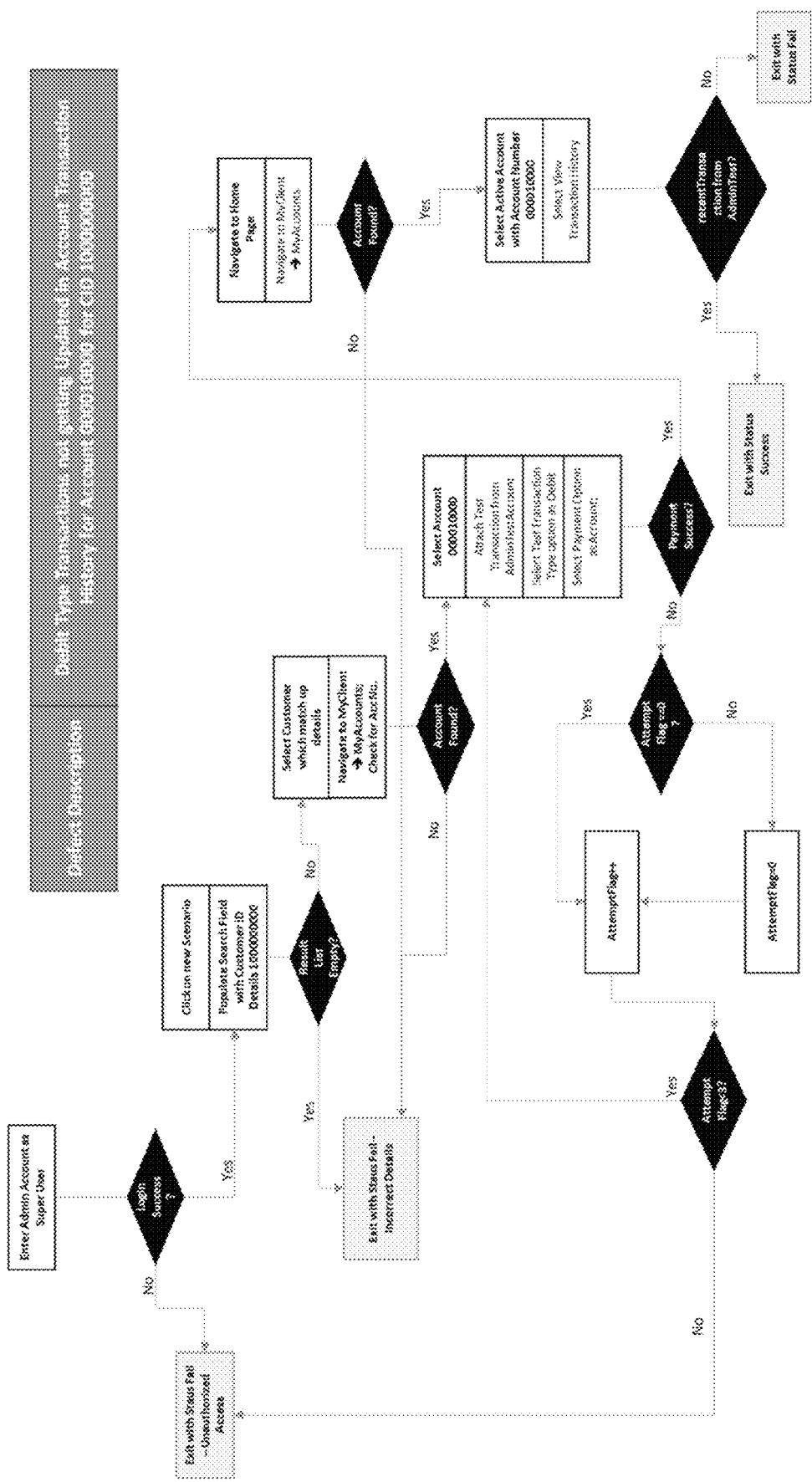
Figure 17:
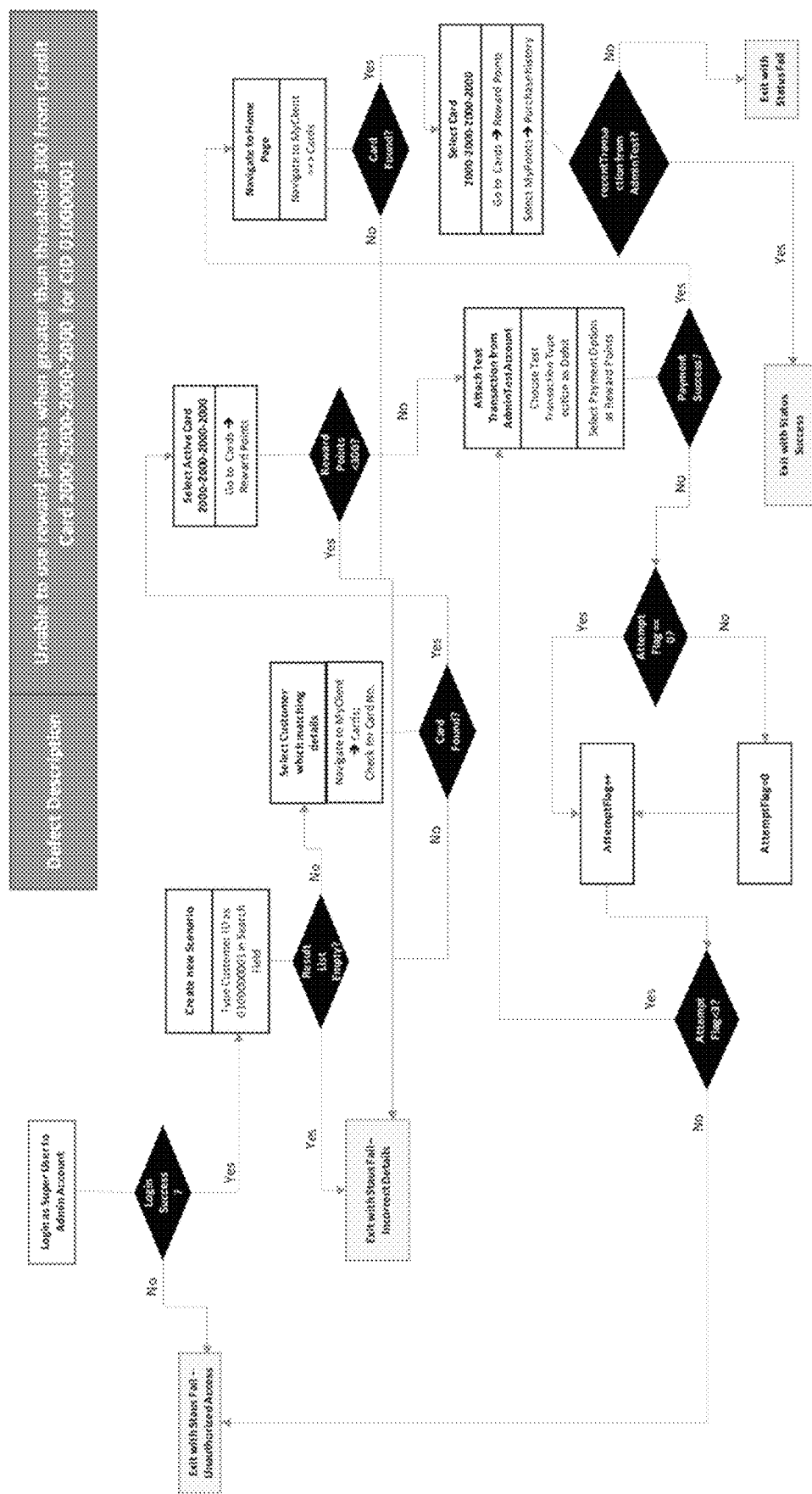
Figure 19:
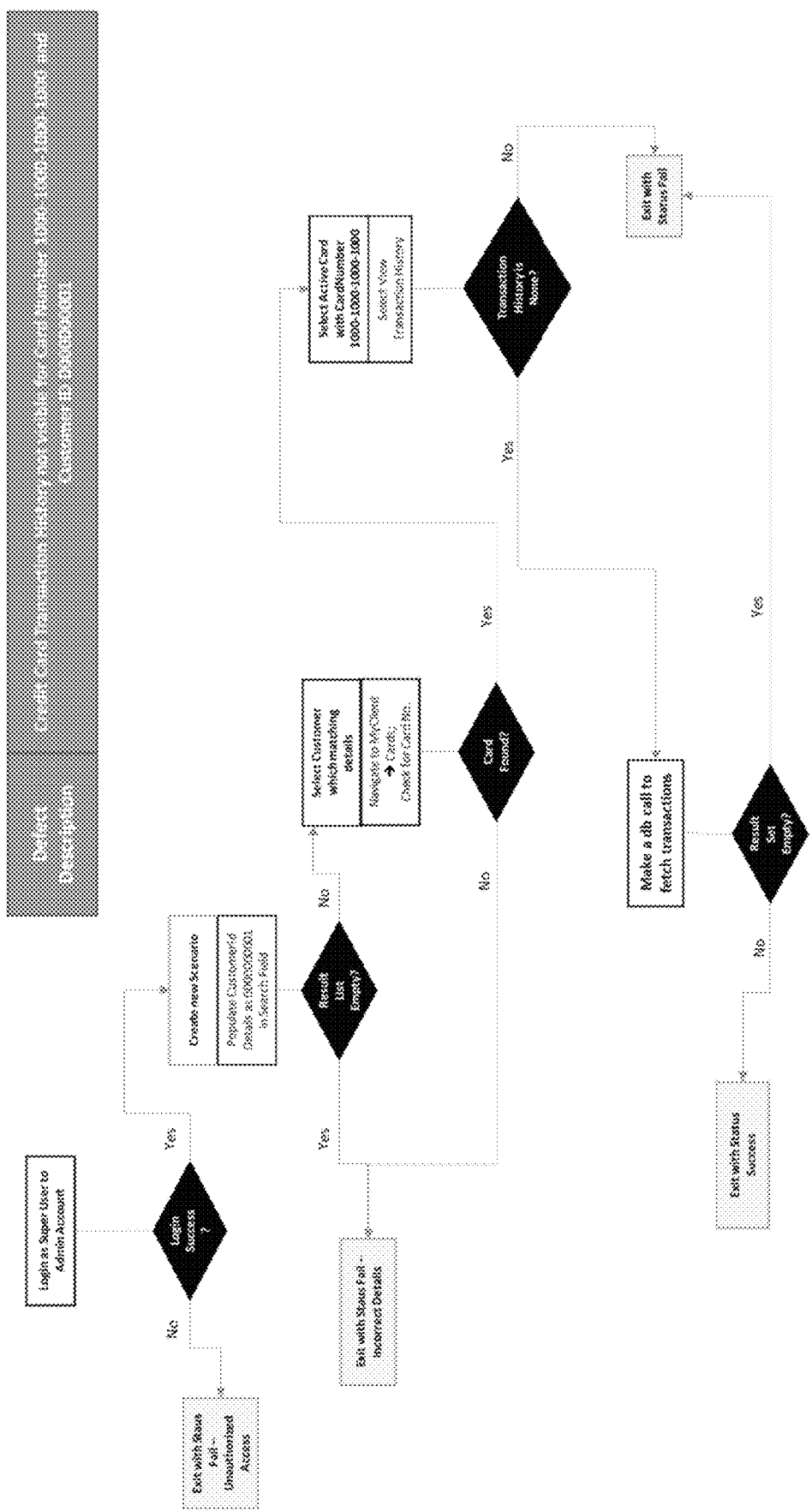
Figure 21:
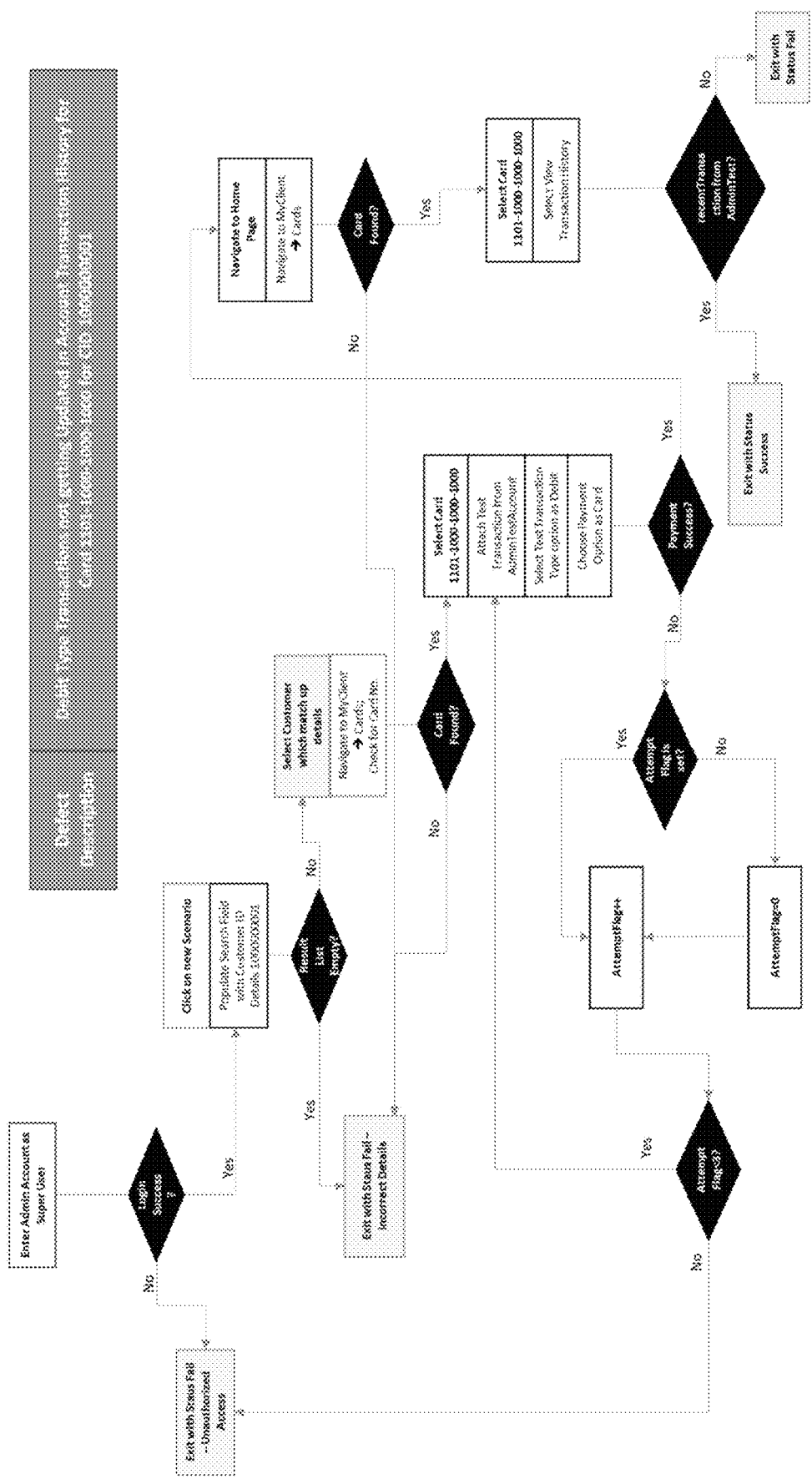
Figure 23:
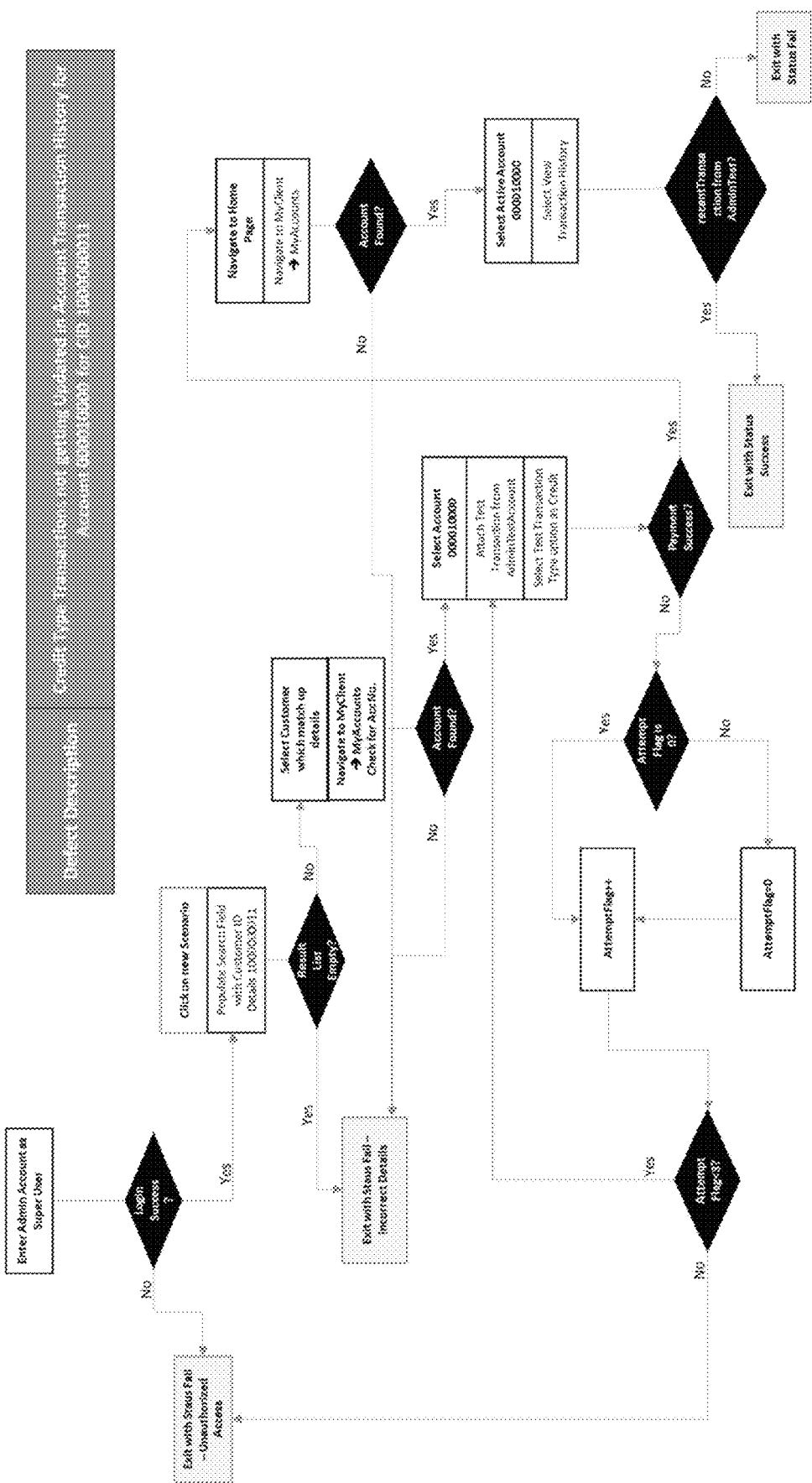
Figure 25:
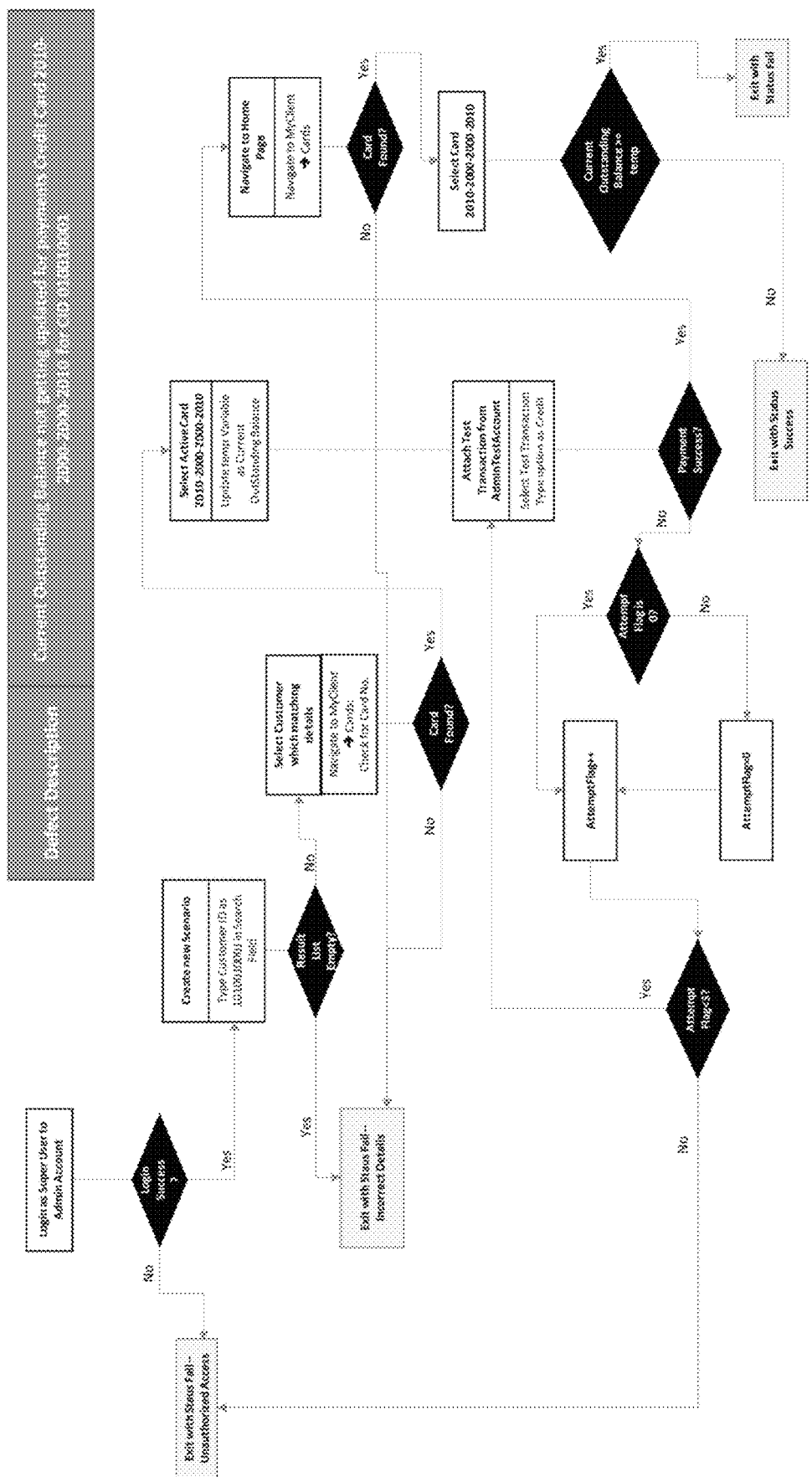

Referring to FIG. 15, the incident action graph corresponding to the Defect-1 is shown. Similarly, FIGS. 17, 19, 21, 23, and 25 show incident action graphs corresponding to the defects of FIGS. 16, 18, 20, 22, and 24.

Figure 28:
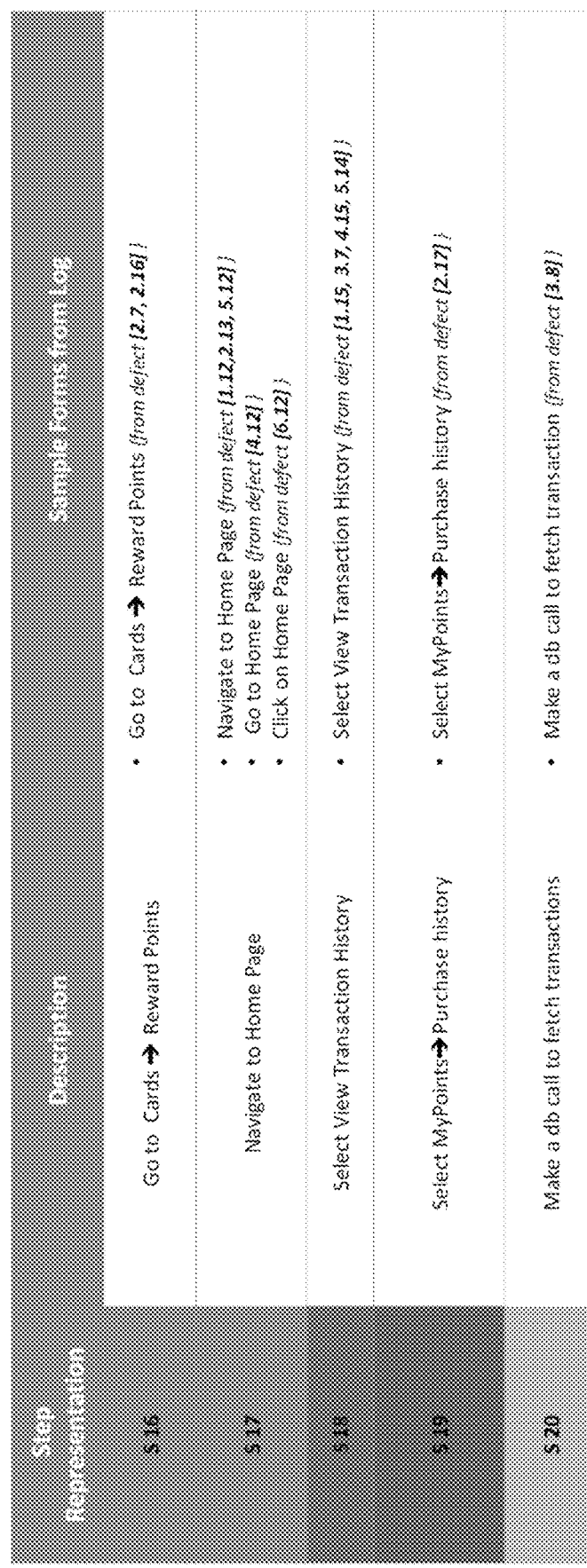

FIGS. 26-28 illustrate step normalization to illustrate operation of the apparatus 100 in accordance with an example of the present disclosure.

Referring to FIGS. 26-28, the steps from the different defects (e.g., the defects of FIGS. 14, 16, 18, 20, 22, and 24) may be analyzed to normalize (e.g., combine) the steps based on semantic similarity. For example, step S1, which may include a description of "Enter Admin Account as Super User", may be present in the different defects as "Enter Admin Account as Super User {from defect [1.1, 4.1, 5.1]}", "Login as Super User to Admin Account {from defect [2.1]}", "Login to Admin Account (Super User) {from defect [3.1]}", and "Login as Super User to Admin Account {from defect [6.1]}".

Figure 29:
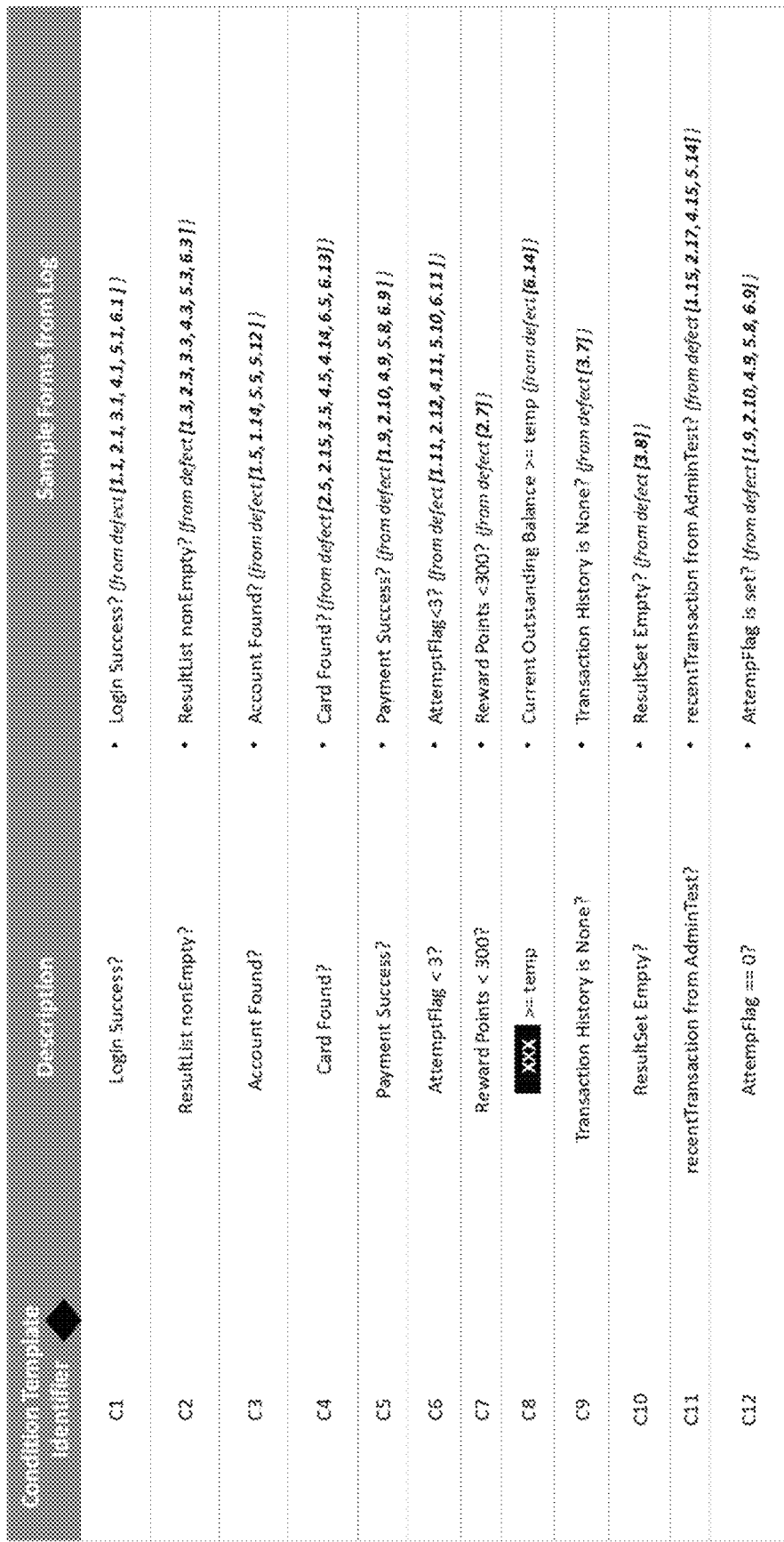
FIG. 29 illustrate condition normalization to illustrate operation of the learning based incident or defect resolution, and test generation apparatus of FIG. 1 in accordance with an example of the present disclosure.
Figure 31:
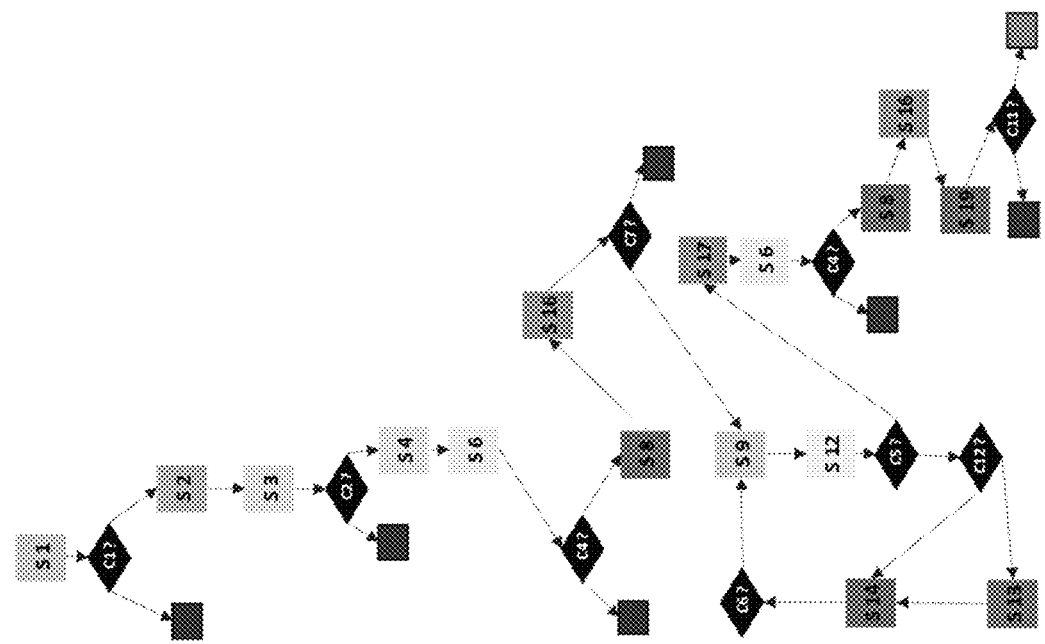
Figure 30:
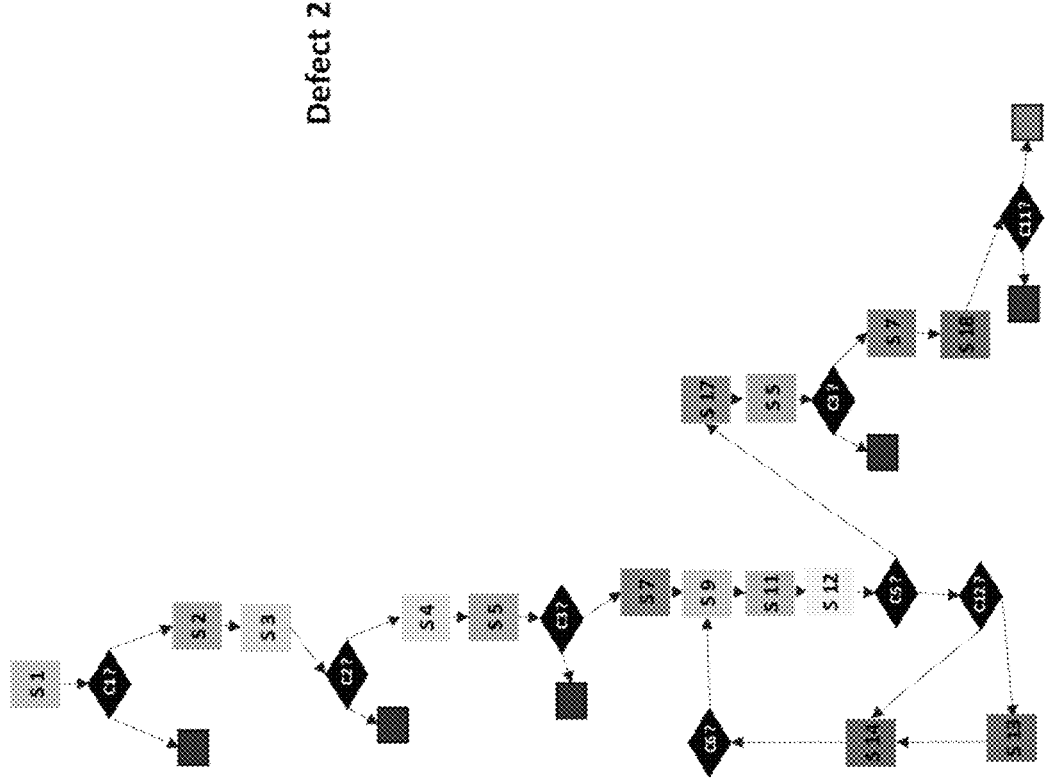
Figure 33:
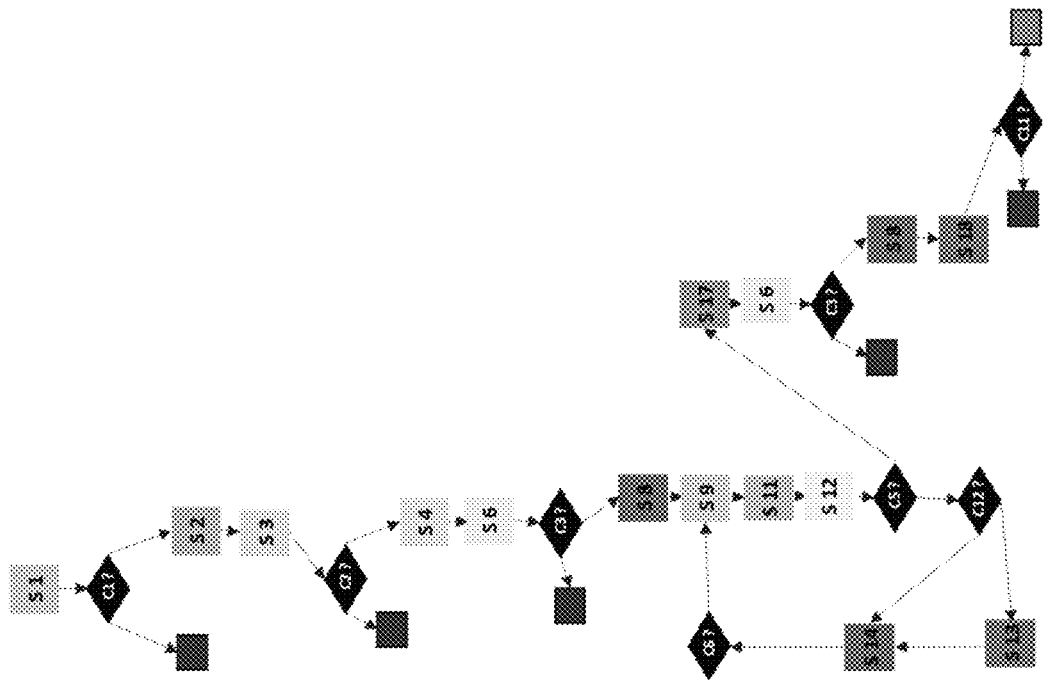
Figure 32:
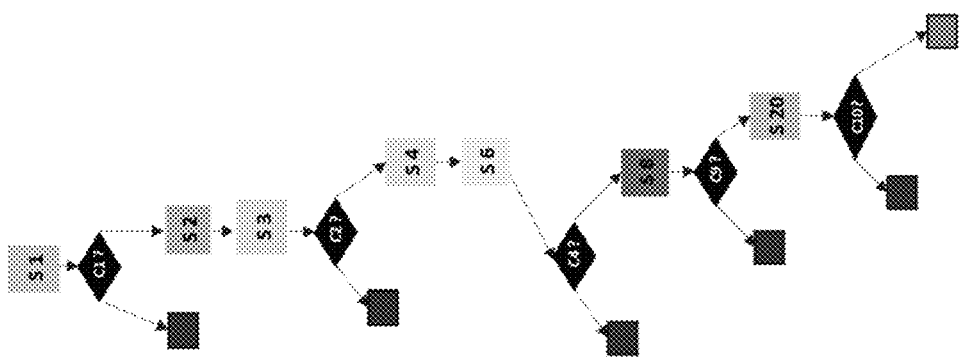

FIG. 29 illustrate condition normalization to illustrate operation of the apparatus 100 in accordance with an example of the present disclosure.

As disclosed herein with reference to FIGS. 26-28, conditions may be similarly normalized based on semantic similarities.

FIGS. 30-35 illustrate incident action graphs for the defects of FIGS. 14-25 to illustrate operation of the apparatus 100 in accordance with an example of the present disclosure.

Figure 36:
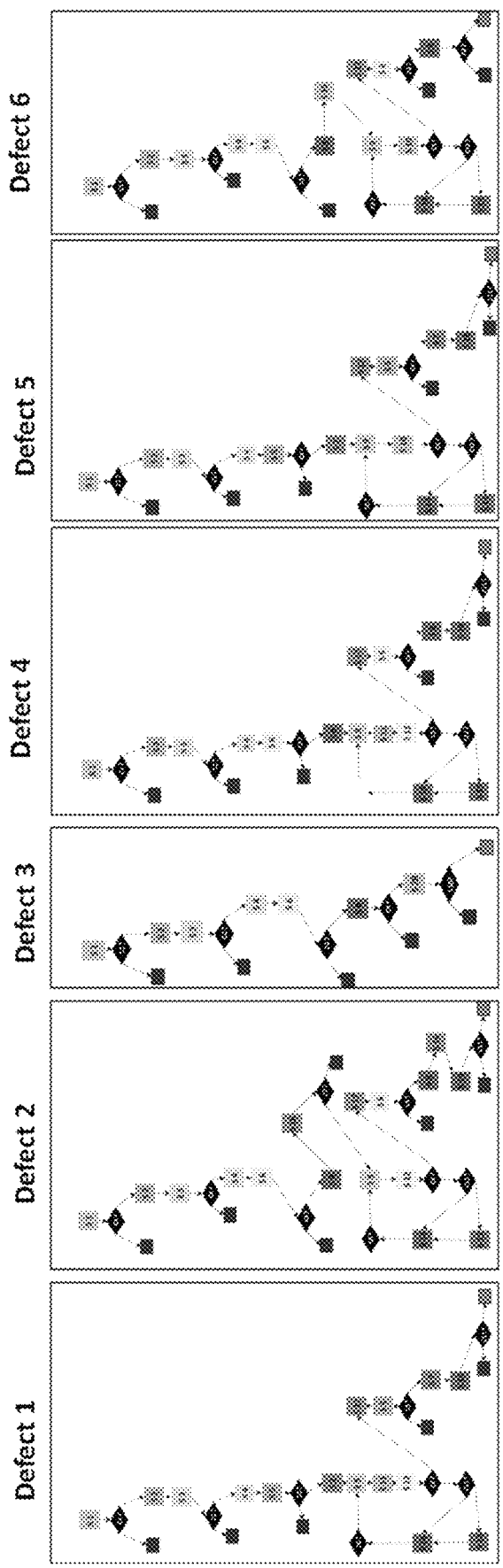
FIG. 36 illustrates incident action graphs for the defects of FIGS. 14-25 to illustrate operation of the learning based incident or defect resolution, and test generation apparatus of FIG. 1 in accordance with an example of the present disclosure.

FIG. 36 illustrates incident action graphs for the defects of FIGS. 14-25 to illustrate operation of the apparatus 100 in accordance with an example of the present disclosure.

FIGS. 37-41 illustrate new defect reproduction to illustrate operation of the apparatus 100 in accordance with an example of the present disclosure.

Figure 37:
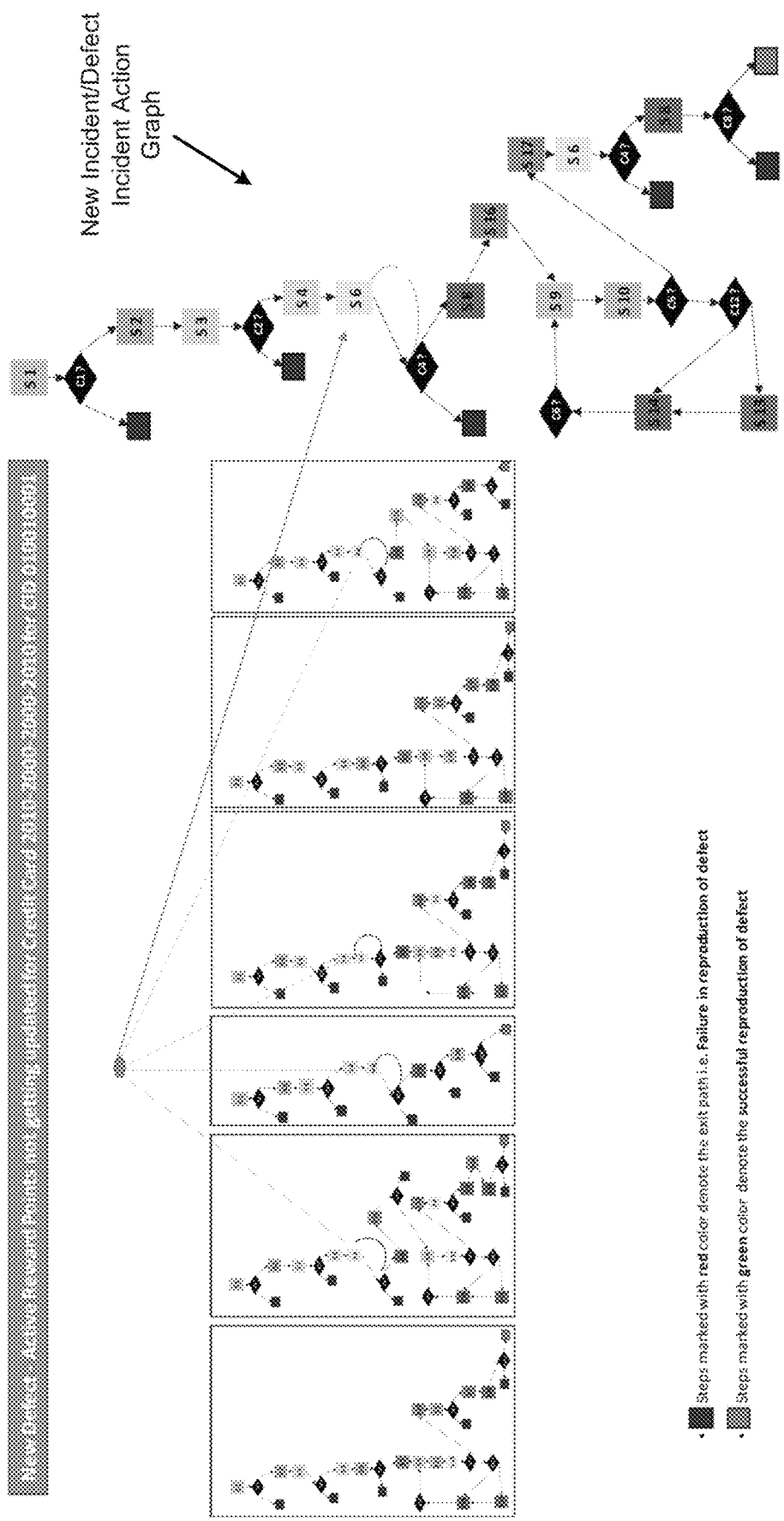

Referring to FIG. 37, as disclosed herein, parameters for selection of steps for the incident action graph 114 for a new defect may include semantic similarity between new defect (or new incident) and existing defects in the historical log data 104, semantic relatedness between the new defect with a step appearing in one or more defects in the historical log data 104, previous step chosen (e.g., there exists control and data flow relations between consecutive steps), and dependencies among sequence of steps. For example, as shown in FIG. 37, steps S1→S2→S3→S4 may represent the most commonly occurring initial sequence from the historical log data 104.

Step S6 (Navigate to MyClient→Cards; Check for Card No), as also shown in FIG. 26, may be selected because the new defect relates to a credit card. Analysis of the historical log data 104 may result in two possibilities. One option may be S5;C3 (e.g., denoted as step S3; condition C3), and the second option may be S6;C4. Since S5;C3 relate to "accounts" (e.g., see FIGS. 26-29), and S6;C4 relate to "cards", similarity of the new defect with S6;C4 would be higher, and also include higher support from the historical log data 104 being present in four out of six defects as shown in FIGS. 14-25.

Step S8 may be selected because it is the most frequent immediate next step after S6.

Step S16 (Go to Cards Reward Points) may be selected because in the historical log data 104, the defect related to Reward Point (i.e., Defect-2 of FIG. 31) has step S16 as a next step to step S8, and the new defect is also related to "reward points" functionality.

Following step S16, analysis of the historical log data 104 may result in two possibilities. One option (Option-1) includes step S9 (from Defect-2 of FIG. 31), and a second option (Option-2) includes step S19 (from Defect-2 of FIG. 31).

Step S9 may be selected based on similarity of past sequence of steps from the new defect.

For example, past sequence from Option-1 (S16→S9)= ((S1→S2→S3→S4→S6→S8→S16)→S9).

Past sequence from Option-2 (S16→S9)= ((S1→S2→S3→S4→S6→S8→S16→S9→S12→S13→S14→S17→S6→S8→S16)→S19).

Past sequence from new defect (S16→?)= ((S1→S2→S3→S4→S6→S8→S16)→?).

Following step S9, there are three possibilities from historic log analysis. One option includes step S12 (from Defect-2 of FIG. 31), a second option includes step S11 (from Defect-1 of FIG. 30, from Defect-4 of FIG. 33), and a third option includes step S10 (from Defect-5 of FIG. 34, from Defect-6 of FIG. 35).

The output generator 120 may generate, based on the analysis of the machine learning model with respect to the new incident or defect, the output that includes the sequence of actions to reproduce, for the new incident, steps that result in the new incident, reproduce, for the new defect, the error that results in the new defect, identify the root cause of the new incident or defect, and/or resolve the new incident or defect by analyzing step to defect similarity between a step of the historical log data and the new incident or defect, and analyzing defect to defect similarity between a defect of the historical log data and the new incident or defect. That is, step S10 may be selected based on step to defect similarity, and defect to defect similarity between Defect-6 of FIG. 35, and the new defect.

Following S10:C5, only one sequence S13→S14 (when C5 is False), and S17 (when C5 is True) is possible.

Following step S17, there are two possibilities from historical log analysis. One option is S5;C3, and a second option is S6;C4. Since S5;C3 are related to "accounts", and S6;C4 are related to "cards", similarity of the new defect with S6;C4 would be higher, and also they have higher support from the historical log data 104 being present in four out of six defects (e.g., from FIGS. 14-25).

Thus, step S8 may be selected because it is the most frequent immediate next step after step S6.

Following step S8, the options include step S15 (from Defect-6 of FIG. 35), step S16 (from Defect-2 of FIG. 31), step S20 (from Defect-3 of FIG. 32), step S18 (from Defect-4 of FIG. 33), and final condition check C8 (from Defect-6 of FIG. 35).

The final condition check C8 may be selected based on defect to defect similarity between the new defect and Defect-6 of FIG. 35, and also similarity of past sequences of steps from the new defect and Defect-6 of FIG. 35.

Figure 38:
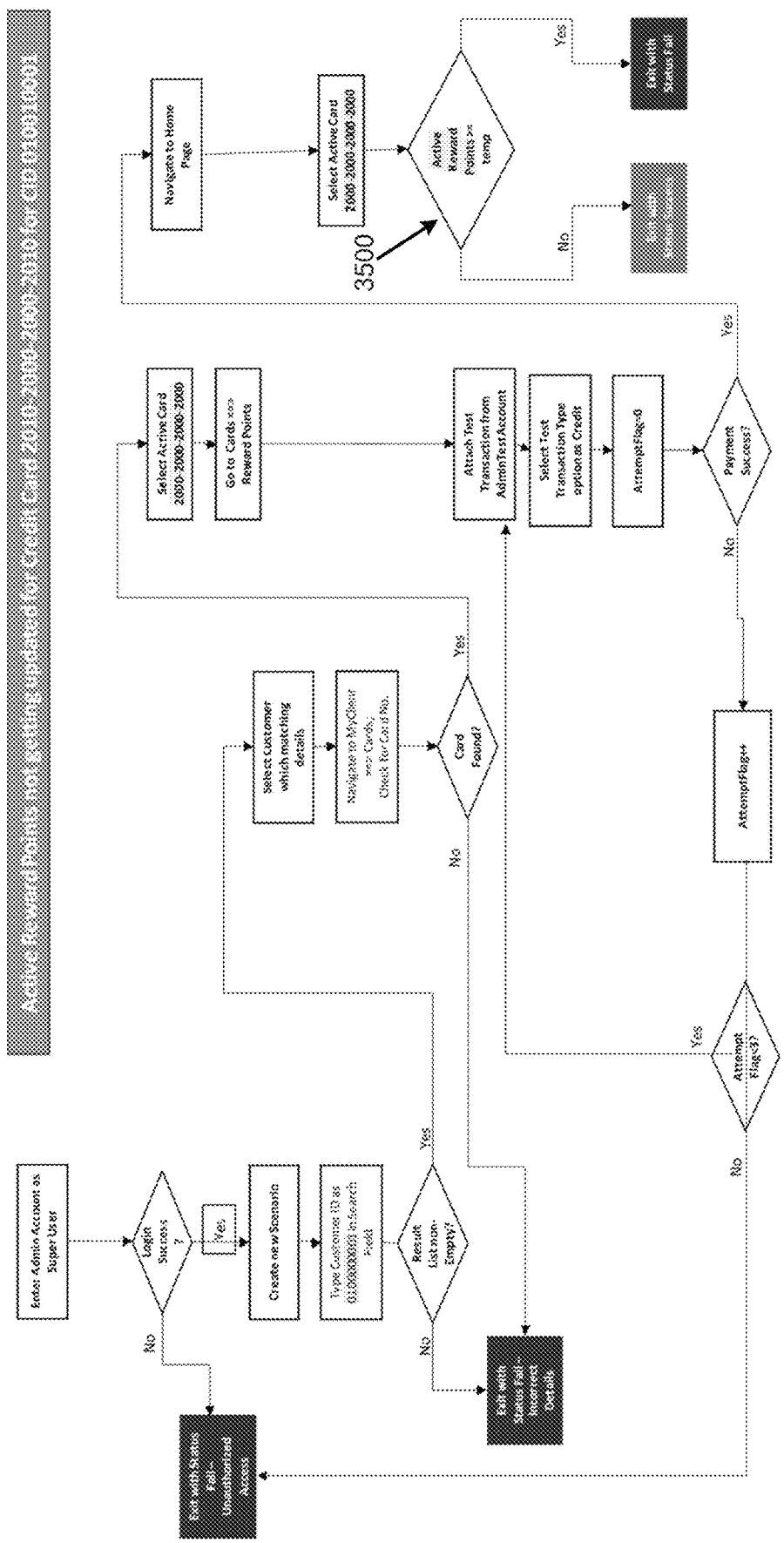

Referring to FIG. 38, the user 130 may be prompted to complete information with respect to the incident action graph for the new defect of FIG. 37. In this regard, as shown at 3500, for "Active Reward Points>=temp", the user 130 may be prompted to respond to thus generate the results of "Exit with Status Success" or "Exit with Status Fail".

Figure 40:
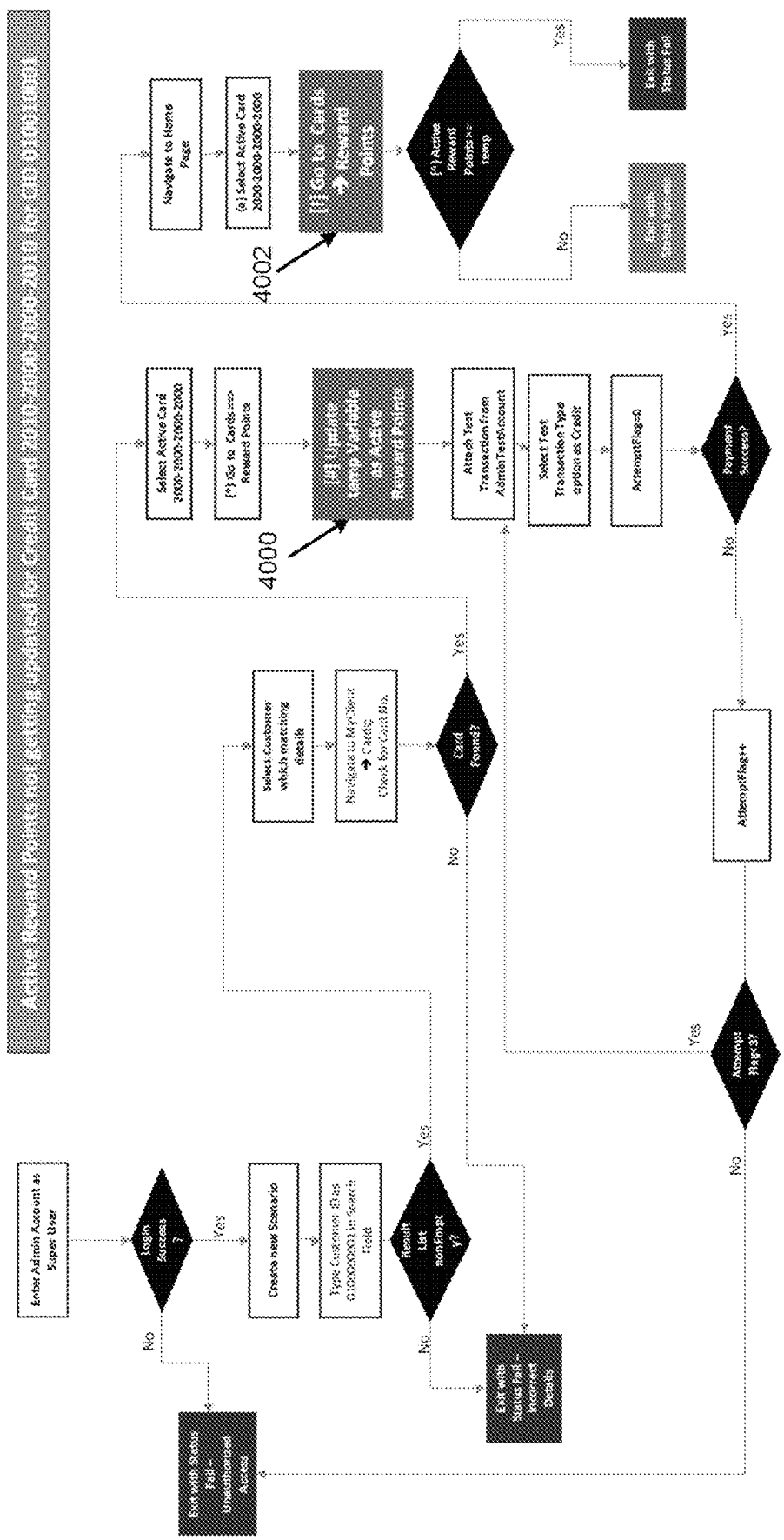

Referring to FIGS. 38 and 40, and particularly FIG. 40, at 4000, with respect to step [#], in the log, step (*) was never followed by step [#], hence the presence of step [#] cannot be predicted. However, whenever (^) condition was part of the execution flow in the log, step [#] was also present as one of the previous steps. Therefore, the user 130, on encountering condition (^), will notice absence of a prior step where variable temp needs to set, and would introduce this step.

At 4002, with respect to step [!], as per the historical log data 104, after step (a), even though there is a transition to step [!], step [!] is unlikely to be selected since step [^] will have more weight for selection. Also, from step [!], there is no transition to step [^]. However, after step [a], one must perform step [!], and from there proceed to step [^].

FIGS. 42-46 illustrate system testing to illustrate operation of the apparatus 100 with respect to test generation. In this regard, a sequence of test steps may be identified to design a new test using details from an existing test suite. A test may include test objective, test data, and test-steps. Test objectives may specify what behavior of the system should be observed by a testing agent. Test data may include the set of values to be given to the system as inputs during testing. Further, test steps may represent the sequence of actions that need to be performed by a testing agent to meet the test objective. According to an example, the existing test-suite may include {Test 1, . . . , Test 5}. For a new test, a test-objective may include "Test if able to do debit type transactions from credit card". The test data may include "Credit Card=0110-0110-0110-0110, CID=1000011000". The test objectives may be derived from system requirements. The test data may be obtained from sources which either simulate system execution, or record details during earlier execution of a system, for example, during production. The test generation may represent an automated technique to test software in order to identify defects in the software by running different tests (e.g., test scripts).

Referring to FIGS. 42-46, existing tests 1-5 are illustrated. As shown in FIGS. 42-46, parameters derived from and specific to test description may be shown in black boxes. The test of FIG. 42 may represent "Test if Debit Type Transactions are correctly getting updated in Account Transaction History". The test of FIG. 43 may represent "Test if able to use reward points when greater than threshold K from Credit Card". The test of FIG. 44 may represent "Test if Reward points history is getting updated on Credit Type Transactions". The test of FIG. 45 may represent "Test if Credit Card Transaction History is visible". The test of FIG. 46 may represent "Test if Date Filter is working on Credit Card Transaction history".

Figure 47:
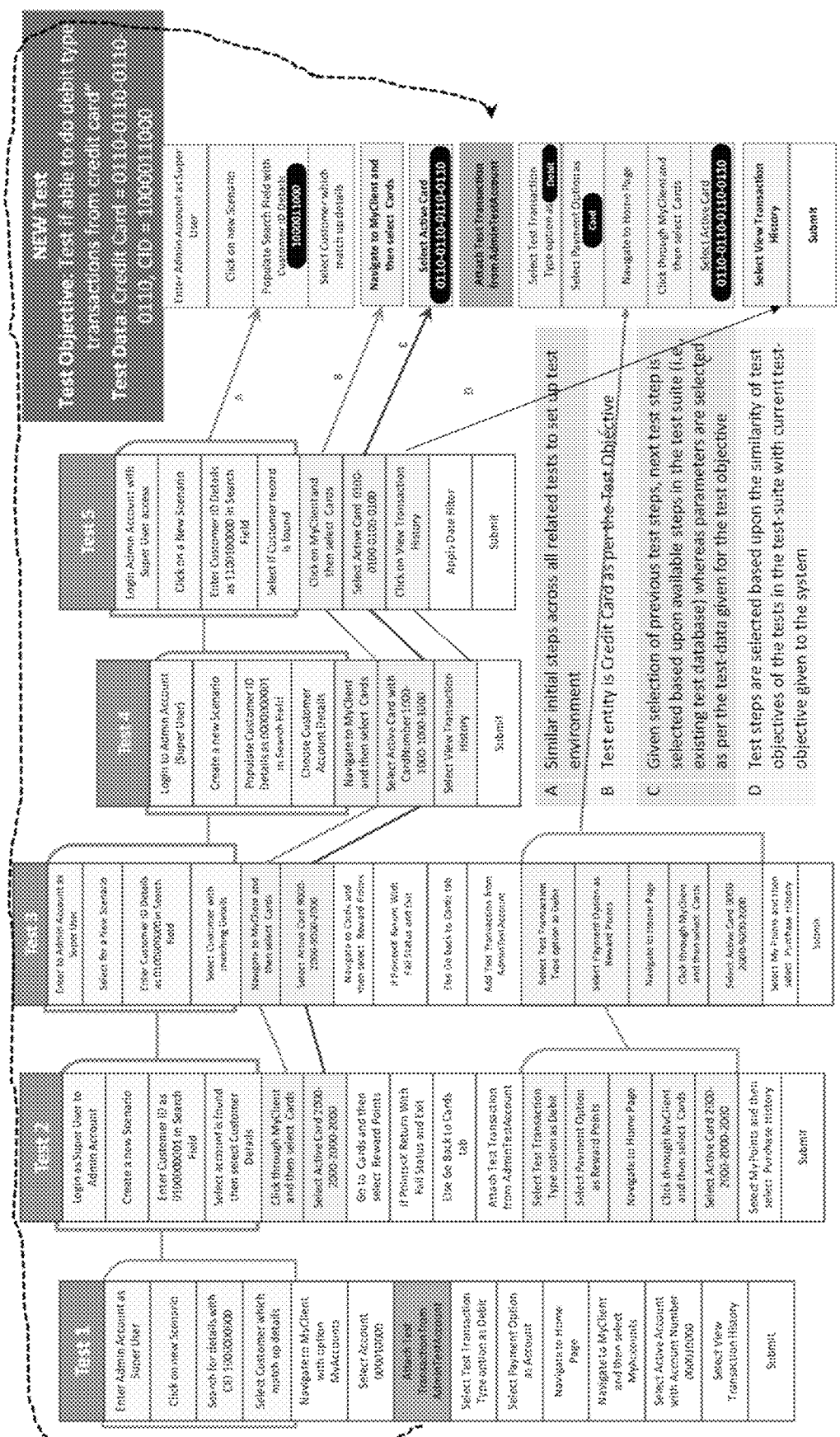
FIG. 47 illustrates further details with respect to the system testing of FIGS. 42-46 to illustrate operation of the learning based incident or defect resolution, and test generation apparatus of FIG. 1 in accordance with an example of the present disclosure.

FIG. 47 illustrates further details with respect to the system testing of FIGS. 42-46 to illustrate operation of the apparatus 100. In this regard, the apparatus 100 may generate a sequence of test-steps based upon details in the existing test-suite, as well test objective and test data given for the new test shown in FIG. 47. For a new test, a test-objective may include "Test if able to do debit type transactions from credit card". The test data may include "Credit Card=0110-0110-0110-0110, CID=1000011000".

Referring to FIG. 47, "A" may represent similar initial steps across all related tests to set up a test environment, "B" may represent that the "Test entity is Credit Card as per the Test Objective", "C" may represent that given selection of previous test steps, a next test step is selected based upon available steps in the test suite (e.g., existing test database) whereas parameters may be selected as per the test-data given for the test objective, and "D" may be used to indicate that steps are selected based upon the similarity of test objectives of the tests in the test-suite with a current test-objective given to the system.

With respect to generation of the sequence of test-steps based upon details in the existing test-suite, as well test objective and test data given for the new test shown in FIG. 47, referring to FIGS. 1 and 42-47, the log data receiver 102 may ascertain the historical log data 104 that includes existing tests such as tests 1 to 5 of FIGS. 42-46. The step action graph generator 106 may generate, based on the historical log data 104 that includes existing tests, the step action graphs 108. The incident and defect action graph generator 110 may generate, based on grouping of the step action graphs 108 with respect to different tests (e.g., similar to the incident and defect tickets 112, but related to tests), a test action graph (similar to the incident and defect action graph 114) for each of the different tests. The machine learning model generator 116 may generate the machine learning model 118 based on an analysis of the historical log data 104 that includes existing tests with respect to each of the test action graphs corresponding to the different tests. The output generator 120 may generate, based on an analysis of the machine learning model 118 with respect to a new test (e.g., as shown in FIG. 47), the output 124 that includes a sequence of test steps to perform the new test (e.g., to meet the test objective and to utilize the test data for the new test).

Figure 48:
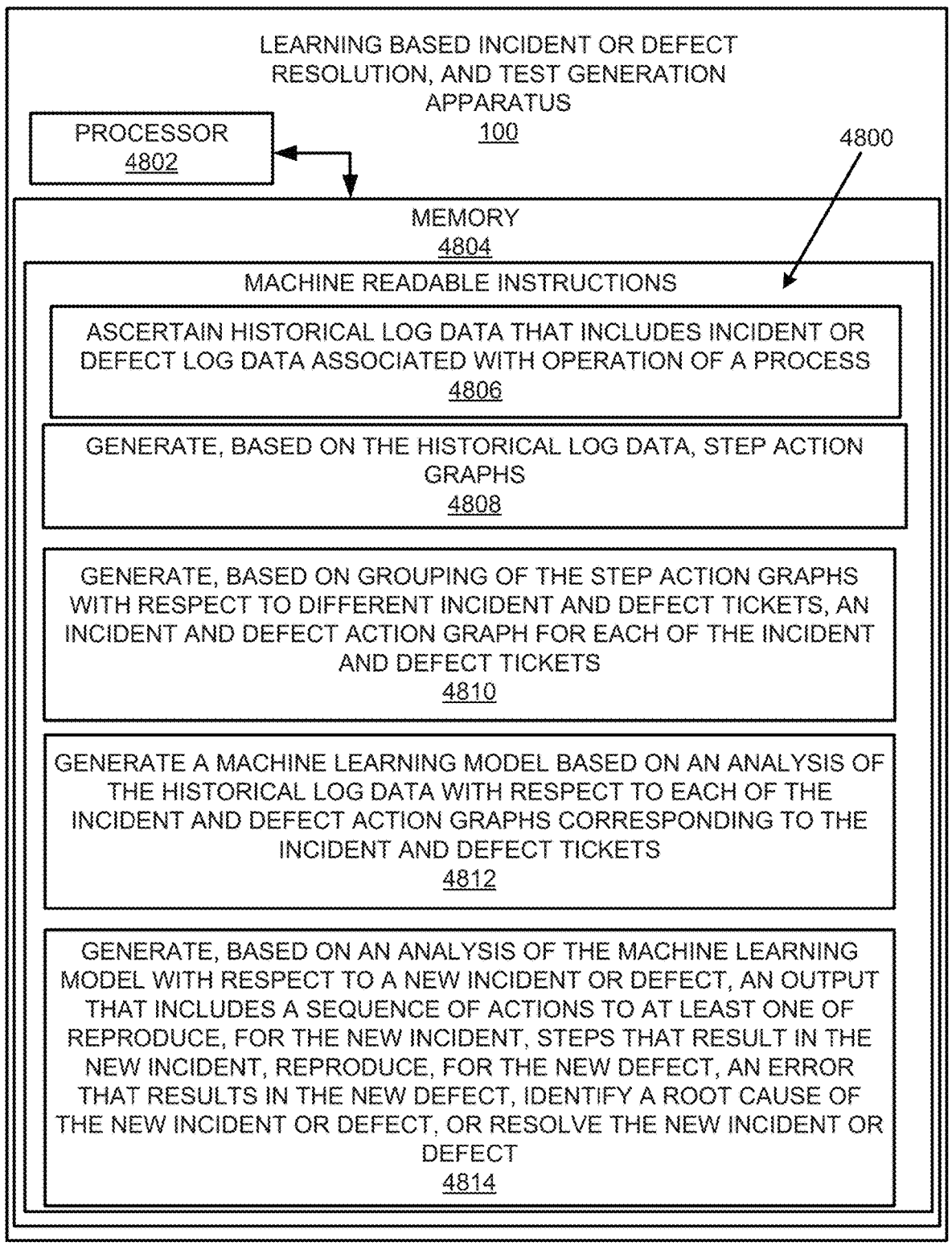
FIG. 48 illustrates an example block diagram for learning based incident or defect resolution, and test generation in accordance with an example of the present disclosure.
Figure 49:
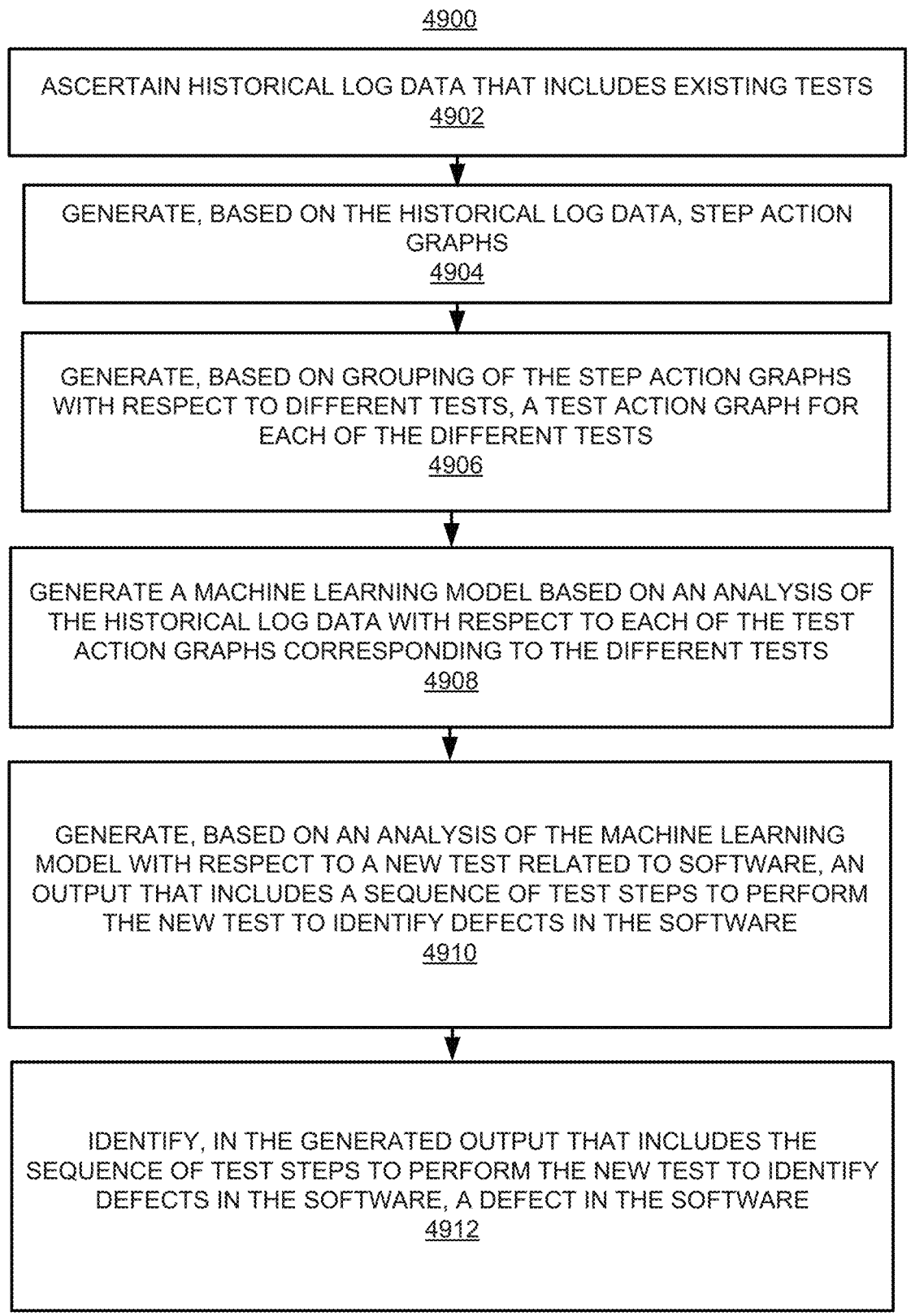
FIG. 49 illustrates a flowchart of an example method for learning based incident or defect resolution, and test generation in accordance with an example of the present disclosure.
Figure 50:
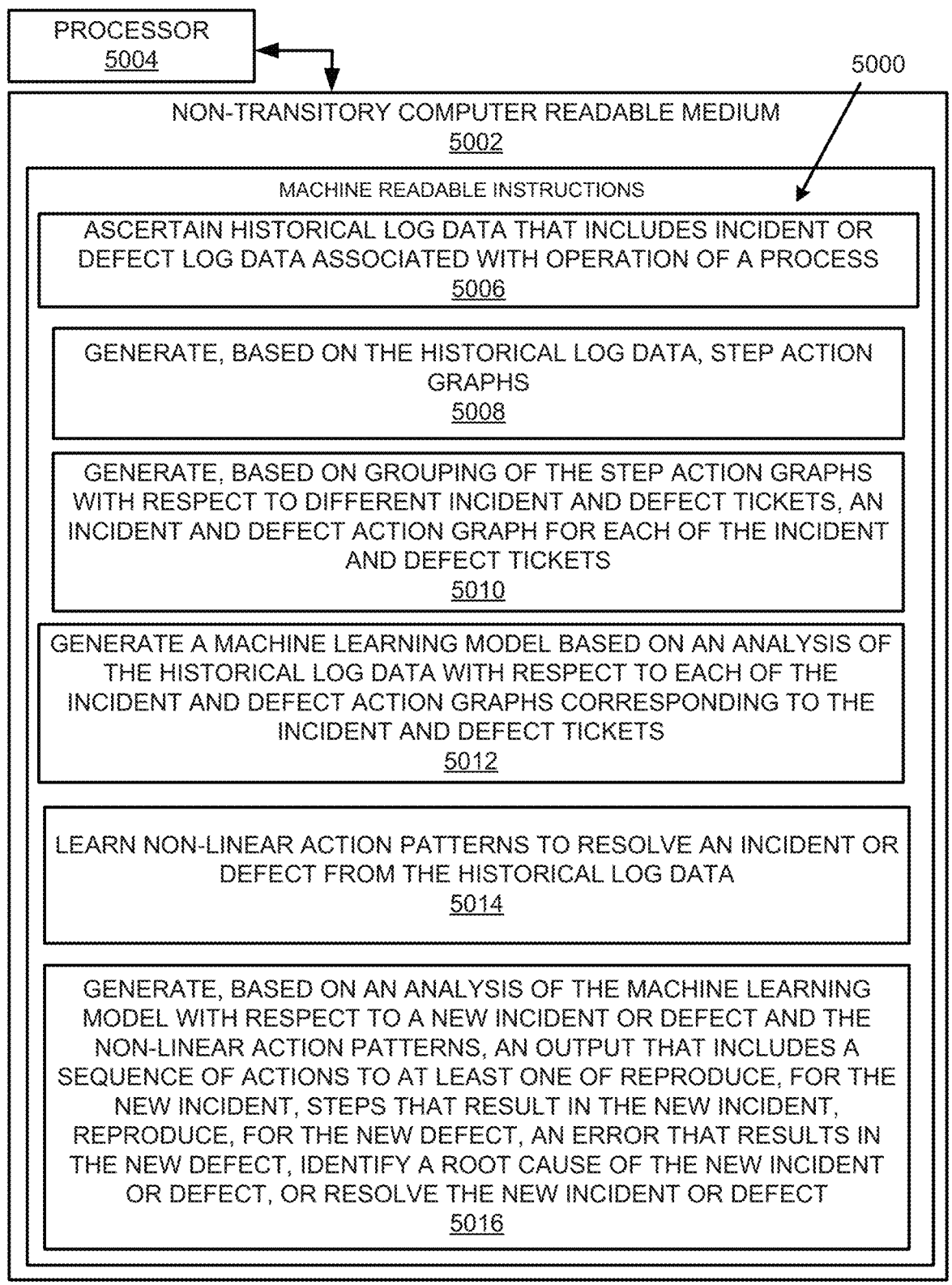
FIG. 50 illustrates a further example block diagram for learning based incident or defect resolution, and test generation in accordance with another example of the present disclosure.

FIGS. 48-50 respectively illustrate an example block diagram 4800, a flowchart of an example method 4900, and a further example block diagram 5000 for learning based incident or defect resolution, and test generation, according to examples. The block diagram 4800, the method 4900, and the block diagram 5000 may be implemented on the apparatus 100 described above with reference to FIG. 1 by way of example and not of limitation. The block diagram 4800, the method 4900, and the block diagram 5000 may be practiced in other apparatus. In addition to showing the block diagram 4800, FIG. 48 shows hardware of the apparatus 100 that may execute the instructions of the block diagram 4800. The hardware may include a processor 4802, and a memory 4804 storing machine readable instructions that when executed by the processor cause the processor to perform the instructions of the block diagram 4800. The memory 4804 may represent a non-transitory computer readable medium. FIG. 49 may represent an example method for learning based incident or defect resolution, and test generation, and the steps of the method. FIG. 50 may represent a non-transitory computer readable medium 5002 having stored thereon machine readable instructions to provide learning based incident or defect resolution, and test generation according to an example. The machine readable instructions, when executed, cause a processor 5004 to perform the instructions of the block diagram 5000 also shown in FIG. 50.

The processor 4802 of FIG. 48 and/or the processor 5004 of FIG. 50 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 5002 of FIG. 50), such as hardware storage devices (e.g., RAM (random access memory), ROM (read only memory), EPROM (erasable, programmable ROM), EEPROM (electrically erasable, programmable ROM), hard drives, and flash memory). The memory 4804 may include a RAM, where the machine readable instructions and data for a processor may reside during runtime.

Referring to FIGS. 1-48, and particularly to the block diagram 4800 shown in FIG. 48, the memory 4804 may include instructions 4806 to ascertain historical log data 104 that includes incident or defect log data associated with operation of a process.

The processor 4802 may fetch, decode, and execute the instructions 4808 to generate, based on the historical log data 104, step action graphs 108.

The processor 4802 may fetch, decode, and execute the instructions 4810 to generate, based on grouping of the step action graphs 108 with respect to different incident and defect tickets 112, an incident and defect action graph 114 (also referred to as incident action graph 114) for each of the incident and defect tickets 112.

The processor 4802 may fetch, decode, and execute the instructions 4812 to generate a machine learning model 118 based on an analysis of the historical log data 104 with respect to each of the incident and defect action graphs corresponding to the incident and defect tickets 112.

The processor 4802 may fetch, decode, and execute the instructions 4814 to generate, based on an analysis of the machine learning model 118 with respect to a new incident or defect 122, an output 124 that includes a sequence of actions to reproduce, for the new incident, steps that result in the new incident, reproduce, for the new defect, an error that results in the new defect, identify a root cause of the new incident or defect, and/or resolve the new incident or defect.

Referring to FIGS. 1-41 and 49, and particularly FIG. 49, for the method 4900, at block 4902, the method may include ascertaining historical log data 104 that includes existing tests.

At block 4904, the method may include generating, based on the historical log data 104, step action graphs 108.

At block 4906, the method may include generating, based on grouping of the step action graphs 108 with respect to different tests (e.g., similar to the incident and defect tickets 112, but related to tests), a test action graph (e.g., similar to the incident and defect action graph 114) for each of the different tests.

At block 4908, the method may include generating a machine learning model 118 based on an analysis of the historical log data 104 with respect to each of the test action graphs corresponding to the different tests.

At block 4910, the method may include generating, based on an analysis of the machine learning model 118 with respect to a new test related to software, an output 124 that includes a sequence of test steps to perform the new test to identify defects in the software.

At block 4912, the method may include identifying, in the generated output 124 that includes the sequence of test steps to perform the new test to identify defects in the software, a defect in the software.

According to examples disclosed herein, the method may further include generating, based on the analysis of the machine learning model with respect to the new test related to software, the output that includes the sequence of test steps to perform the new test to identify defects in the software by ascertaining a test objective and test data for the new test, and generating, based on the analysis of the machine learning model with respect to the test objective and the test data for the new test related to the software, the output that includes the sequence of test steps to perform the new test to identify defects in the software.

Referring to FIGS. 1-41 and 50, and particularly FIG. 50, for the block diagram 5000, the non-transitory computer readable medium 5002 may include instructions 5006 to ascertain historical log data 104 that includes incident or defect log data associated with operation of a process.

The processor 5004 may fetch, decode, and execute the instructions 5008 to generate, based on the historical log data 104, step action graphs 108.

The processor 5004 may fetch, decode, and execute the instructions 5010 to generate, based on grouping of the step action graphs 108 with respect to different incident and defect tickets 112, an incident and defect action graph 114 (also referred to as incident action graph 114) for each of the incident and defect tickets 112.

The processor 5004 may fetch, decode, and execute the instructions 5012 to generate a machine learning model 118 based on an analysis of the historical log data 104 with respect to each of the incident and defect action graphs corresponding to the incident and defect tickets 112.

The processor 5004 may fetch, decode, and execute the instructions 5014 to learn non-linear action patterns to resolve an incident or defect from the historical log data.

The processor 5004 may fetch, decode, and execute the instructions 5016 to generate, based on an analysis of the machine learning model 118 with respect to a new incident or defect 122 and the non-linear action patterns, an output 124 that includes a sequence of actions to reproduce, for the new incident, steps that result in the new incident, reproduce, for the new defect, an error that results in the new defect, identify a root cause of the new incident or defect, and/or resolve the new incident or defect.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A learning based incident or defect resolution, and test generation apparatus comprising:
   a log data receiver, executed by at least one hardware processor, to ascertain historical log data that includes incident or defect log data associated with operation of a process;
   a step action graph generator, executed by the at least one hardware processor, to generate, based on the historical log data, step action graphs;
   an incident and defect action graph generator, executed by the at least one hardware processor, to generate, based on grouping of the step action graphs with respect to different incident and defect tickets, an incident and defect action graph for each of the incident and defect tickets;
   a machine learning model generator, executed by the at least one hardware processor, to generate a machine learning model based on an analysis of the historical log data with respect to each of the incident and defect action graphs corresponding to the incident and defect tickets; and
   an output generator, executed by the at least one hardware processor, to generate, based on an analysis of the machine learning model with respect to a new incident or defect, an output that includes a sequence of actions to at least one of reproduce, for the new incident, steps that result in the new incident, reproduce, for the new defect, an error that results in the new defect, identify a root cause of the new incident or defect, or resolve the new incident or defect.

2. The learning based incident or defect resolution, and test generation apparatus according to claim 1, wherein the step action graph generator is executed by the at least one hardware processor to generate, based on the historical log data, the step action graphs by:
   analyzing, from the historical log data, data related to at least one of resolution of an incident or defect, or data related to reproduction of the incident or defect; and
   transforming, from the analyzed data, textual details from each step into the step action graphs by identifying action terms,
      subjects initiating the action terms, and
      objects associated with the actions terms.

3. The learning based incident or defect resolution, and test generation apparatus according to claim 1, wherein the step action graph generator is executed by the at least one hardware processor to generate, based on the historical log data, the step action graphs by:
   identifying adjacent action terms; and
   joining nodes related to the adjacent action terms by sequential flow edges.

4. The learning based incident or defect resolution, and test generation apparatus according to claim 1, wherein the step action graph generator is executed by the at least one hardware processor to generate, based on the historical log data, the step action graphs by:
   identifying conditionally related action terms; and
   joining nodes related to the conditionally related action terms by conditional branching.

5. The learning based incident or defect resolution, and test generation apparatus according to claim 1, wherein the incident and defect action graph generator is executed by the at least one hardware processor to generate, based on grouping of the step action graphs with respect to different incident and defect tickets, the incident and defect action graph for each of the incident and defect tickets by:
   analyzing, for the step action graphs, directed flow edges that identify sequences of actions; and
   generating, based on grouping of the step action graphs according to the directed flow edges that identify the sequences of actions and with respect to the different incident and defect tickets, the incident and defect action graph for each of the incident and defect tickets.

6. The learning based incident or defect resolution, and test generation apparatus according to claim 1, wherein the machine learning model generator is executed by the at least one hardware processor to generate the machine learning model based on the analysis of the historical log data with respect to each of the incident and defect action graphs corresponding to the incident and defect tickets by:
   learning non-linear patterns of actions to resolve an incident or defect from the historical log data.

7. The learning based incident or defect resolution, and test generation apparatus according to claim 1, wherein the output generator is executed by the at least one hardware processor to generate, based on the analysis of the machine learning model with respect to the new incident or defect, the output that includes the sequence of actions to at least one of reproduce, for the new incident, steps that result in the new incident, reproduce, for the new defect, the error that results in the new defect, identify the root cause of the new incident or defect, or resolve the new incident or defect by:
   determining semantic relatedness between the new incident or defect, and incidents or defects, respectively, of the historical log data; and
   determining whether selection of a step from the historical log data causally constrains selection of a subsequent step from the historical log data.

8. The learning based incident or defect resolution, and test generation apparatus according to claim 7, wherein the output generator is executed by the at least one hardware processor to determine whether selection of the step from the historical log data causally constrains selection of the subsequent step from the historical log data by:
   determining a number of sequences where the step from the historical log data precedes the subsequent step from the historical log data; and
   assigning, based on the number of sequences, a degree of confidence to the step from the historical log data that precedes the subsequent step from the historical log data.

9. The learning based incident or defect resolution, and test generation apparatus according to claim 1, wherein the output generator is executed by the at least one hardware processor to generate, based on the analysis of the machine learning model with respect to the new incident or defect, the output that includes the sequence of actions to at least one of reproduce, for the new incident, steps that result in the new incident, reproduce, for the new defect, the error that results in the new defect, identify the root cause of the new incident or defect, or resolve the new incident or defect by:
   analyzing step to defect similarity between a step of the historical log data and the new incident or defect; and
   analyzing defect to defect similarity between a defect of the historical log data and the new incident or defect.

10. The learning based incident or defect resolution, and test generation apparatus according to claim 1, further comprising:
   a user feedback analyzer, executed by the at least one hardware processor, to
      identify, in the generated output that includes the sequence of actions to at least one of reproduce, for the new incident, the steps that result in the new incident, reproduce, for the new defect, the error that results in the new defect, or resolve the new incident or defect, an incomplete feature of the generated output;

ascertain feedback with respect to the incomplete feature;

update, based on the feedback, the historical log data with respect to incomplete feature; and update the machine learning model based on an analysis of the updated historical log data.

11. The learning based incident or defect resolution, and test generation apparatus according to claim 10, wherein the user feedback analyzer is executed by the at least one hardware processor to:

generate a further incident and defect action graph with respect to the new incident or defect;

identify, with respect to the incomplete feature, a difference in an existing incident and defect action graph and the further incident and defect action graph; and continue iterations related to the update of the historical log data with respect to a further incomplete feature and the update of the machine learning model with respect to a further update to the historical log data until elimination of differences in existing incident and defect action graphs and further incident and defect action graphs related to the new incident or defect.

12. A computer implemented method for learning based incident or defect resolution, and test generation comprising:

ascertaining historical log data that includes existing tests;

generating, based on the historical log data, step action graphs;

generating, based on grouping of the step action graphs with respect to different tests, a test action graph for each of the different tests;

generating a machine learning model based on an analysis of the historical log data with respect to each of the test action graphs corresponding to the different tests;

generating, based on an analysis of the machine learning model with respect to a new test related to software, an output that includes a sequence of test steps to perform the new test to identify defects in the software; and identifying, in the generated output that includes the sequence of test steps to perform the new test to identify defects in the software, a defect in the software.

13. The computer implemented method according to claim 12, wherein generating, based on the analysis of the machine learning model with respect to the new test related to software, the output that includes the sequence of test steps to perform the new test to identify defects in the software further comprises:

ascertaining a test objective and test data for the new test; and generating, based on the analysis of the machine learning model with respect to the test objective and the test data for the new test related to the software, the output that includes the sequence of test steps to perform the new test to identify defects in the software.

14. A non-transitory computer readable medium having stored thereon machine readable instructions, the machine readable instructions, when executed by at least one hardware processor, cause the at least one hardware processor to:

ascertain historical log data that includes incident or defect log data associated with operation of a process;

generate, based on the historical log data, step action graphs;

generate, based on grouping of the step action graphs with respect to different incident and defect tickets, an incident and defect action graph for each of the incident and defect tickets;

generate a machine learning model based on an analysis of the historical log data with respect to each of the incident and defect action graphs corresponding to the incident and defect tickets;

learn non-linear action patterns to resolve an incident or defect from the historical log data; and generate, based on an analysis of the machine learning model with respect to a new incident or defect and the non-linear action patterns, an output that includes a sequence of actions to at least one of reproduce, for the new incident, steps that result in the new incident, reproduce, for the new defect, an error that results in the new defect, identify a root cause of the new incident or defect, or resolve the new incident or defect.

15. The non-transitory computer readable medium according to claim 14, wherein the machine readable instructions to generate, based on the historical log data, the step action graphs, when executed by the at least one hardware processor, further cause the at least one hardware processor to:

analyze, from the historical log data, data related to at least one of resolution of an incident or defect, or data related to reproduction of the incident or defect; and transform, from the analyzed data, textual details from each step into the step action graphs by identifying action terms, subjects initiating the action terms, and objects associated with the actions terms.

16. The non-transitory computer readable medium according to claim 14, wherein the machine readable instructions to generate, based on the historical log data, the step action graphs, when executed by the at least one hardware processor, further cause the at least one hardware processor to:

identify adjacent action terms; and join nodes related to the adjacent action terms by sequential flow edges.

17. The non-transitory computer readable medium according to claim 14, wherein the machine readable instructions to generate, based on the historical log data, the step action graphs, when executed by the at least one hardware processor, further cause the at least one hardware processor to:

identify conditionally related action terms; and join nodes related to the conditionally related action terms by conditional branching.

18. The non-transitory computer readable medium according to claim 14, wherein the machine readable instructions to generate, based on grouping of the step action graphs with respect to different incident and defect tickets, the incident and defect action graph for each of the incident and defect tickets, when executed by the at least one hardware processor, further cause the at least one hardware processor to:

analyze, for the step action graphs, directed flow edges that identify sequences of actions; and generate, based on grouping of the step action graphs according to the directed flow edges that identify the sequences of actions and with respect to the different incident and defect tickets, the incident and defect action graph for each of the incident and defect tickets.

19. The non-transitory computer readable medium according to claim 14, wherein the machine readable instructions to generate, based on the analysis of the machine learning model with respect to the new incident or defect, the output that includes the sequence of actions to at least one of reproduce, for the new incident, steps that result in the new incident, reproduce, for the new defect, the error that results in the new defect, identify the root cause of the new incident or defect, or resolve the new incident or defect, when executed by the at least one hardware processor, further cause the at least one hardware processor to:
- determine semantic relatedness between the new incident or defect, and incidents or defects, respectively, of the historical log data; and
- determine whether selection of a step from the historical log data causally constrains selection of a subsequent step from the historical log data.

20. The non-transitory computer readable medium according to claim 19, wherein the machine readable instructions to determine whether selection of the step from the historical log data causally constrains selection of the subsequent step from the historical log data, when executed by the at least one hardware processor, further cause the at least one hardware processor to:
- determine a number of sequences where the step from the historical log data precedes the subsequent step from the historical log data; and
- assign, based on the number of sequences, a degree of confidence to the step from the historical log data that precedes the subsequent step from the historical log data.

* * * * *